(12) United States Patent
Mamada

(10) Patent No.: US 7,497,679 B2
(45) Date of Patent: Mar. 3, 2009

(54) INJECTION MOLD HAVING A SWITCHING VALVE

(75) Inventor: Tsuneo Mamada, Gunma (JP)

(73) Assignee: Mamada Sangyo, Gunma (JP)

( * ) Notice: Subject to any disclaimer, the term of this patent is extended or adjusted under 35 U.S.C. 154(b) by 0 days.

(21) Appl. No.: 11/630,313

(22) PCT Filed: Jun. 21, 2005

(86) PCT No.: PCT/JP2005/011385

§ 371 (c)(1),
(2), (4) Date: Dec. 20, 2006

(87) PCT Pub. No.: WO2005/123358

PCT Pub. Date: Dec. 29, 2005

(65) Prior Publication Data

US 2008/0031996 A1 Feb. 7, 2008

(30) Foreign Application Priority Data

| Jun. 21, 2004 | (JP) | ............................. 2004-182992 |
| Aug. 13, 2004 | (JP) | ............................. 2004-235928 |
| Apr. 26, 2005 | (JP) | ............................. 2005-128690 |
| Apr. 26, 2005 | (JP) | ............................. 2005-128700 |

(51) Int. Cl.
*B29C 45/73* (2006.01)

(52) U.S. Cl. ............... 425/546; 425/812; 425/DIG. 60; 264/102

(58) Field of Classification Search ................. 425/812, 425/DIG. 60, 546; 254/102; 264/102
See application file for complete search history.

(56) References Cited

U.S. PATENT DOCUMENTS 6,425,433 B1 * 7/2002 Hayes ........................ 164/305

FOREIGN PATENT DOCUMENTS

| JP | 56 060209 | 5/1981 |
| JP | 62 180508 | 11/1987 |
| JP | 64 008014 | 1/1989 |
| JP | H01 166518 | 11/1989 |
| JP | 03 057018 | 5/1991 |
| JP | 2001-129833 | 5/2001 |
| JP | 2002-225096 | 8/2002 |

* cited by examiner

*Primary Examiner*—Tim Heitbrink
(74) *Attorney, Agent, or Firm*—Katten Muchin Rosenman LLP

(57) ABSTRACT

The mold comprises a stationary mold half (31) and a movable mold half (32). An annular groove (33) surrounding a cavity (30a) formed by the stationary mold half (31) and the movable mold half (32) is formed in one of the stationary mold half (31) and the movable mold half (32), and a mold seal member (36) formed of a silicon rubber is disposed in the annular groove (33). A mold seal groove (37) opposed to the mold seal member (36) is formed in the other of the stationary mold half (31) and the movable mold half (32). The mold seal member (36) is projected from the contact surface of the stationary mold half (31) or the movable mold half (32) and comprises a fitting part (36a) fittedly installable in the mold seal groove (37). The cross sections of the fitting part (36a) and the mold seal groove (37) are formed in an approximately same shape.

2 Claims, 20 Drawing Sheets

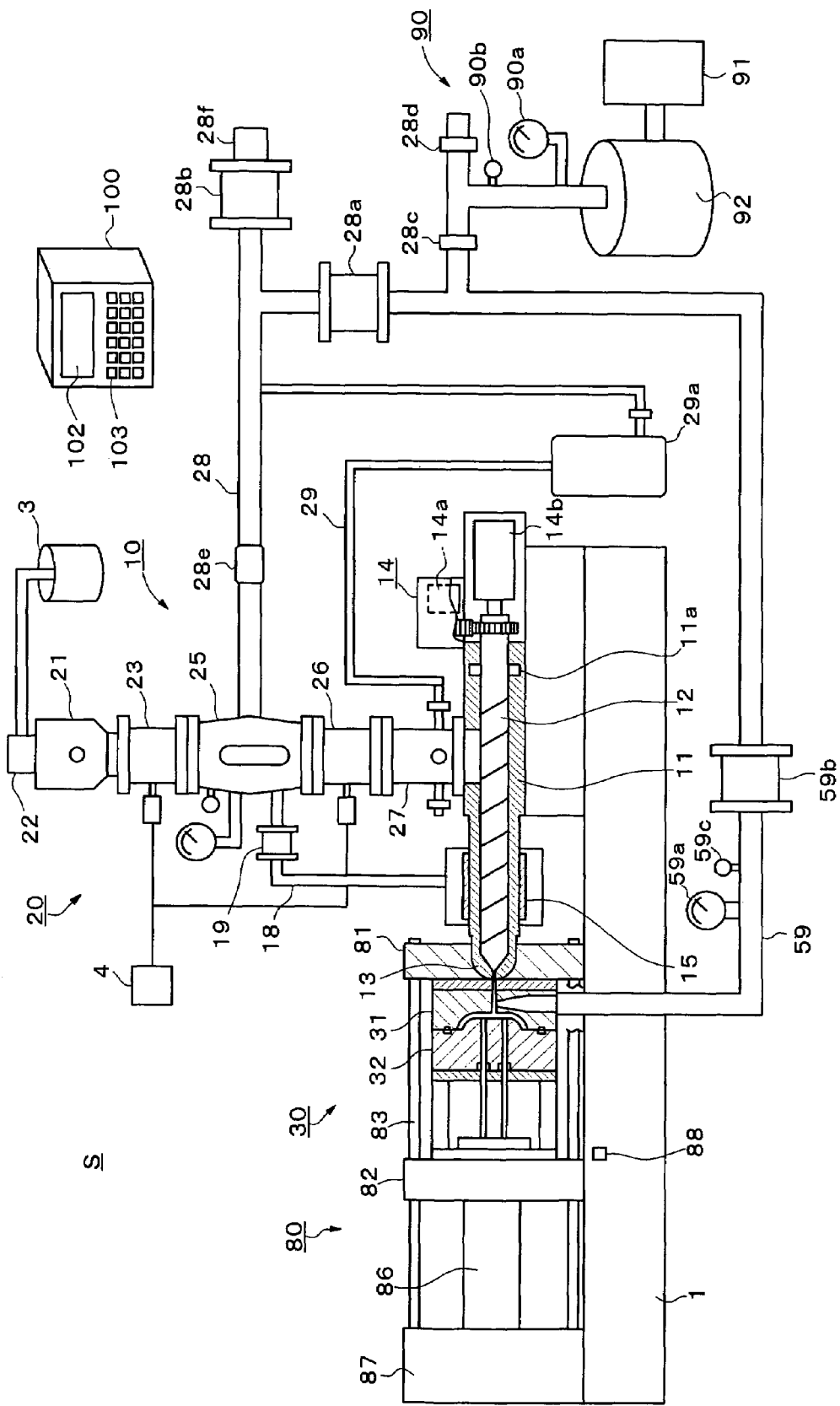
[FIG. 1]

[FIG. 2]
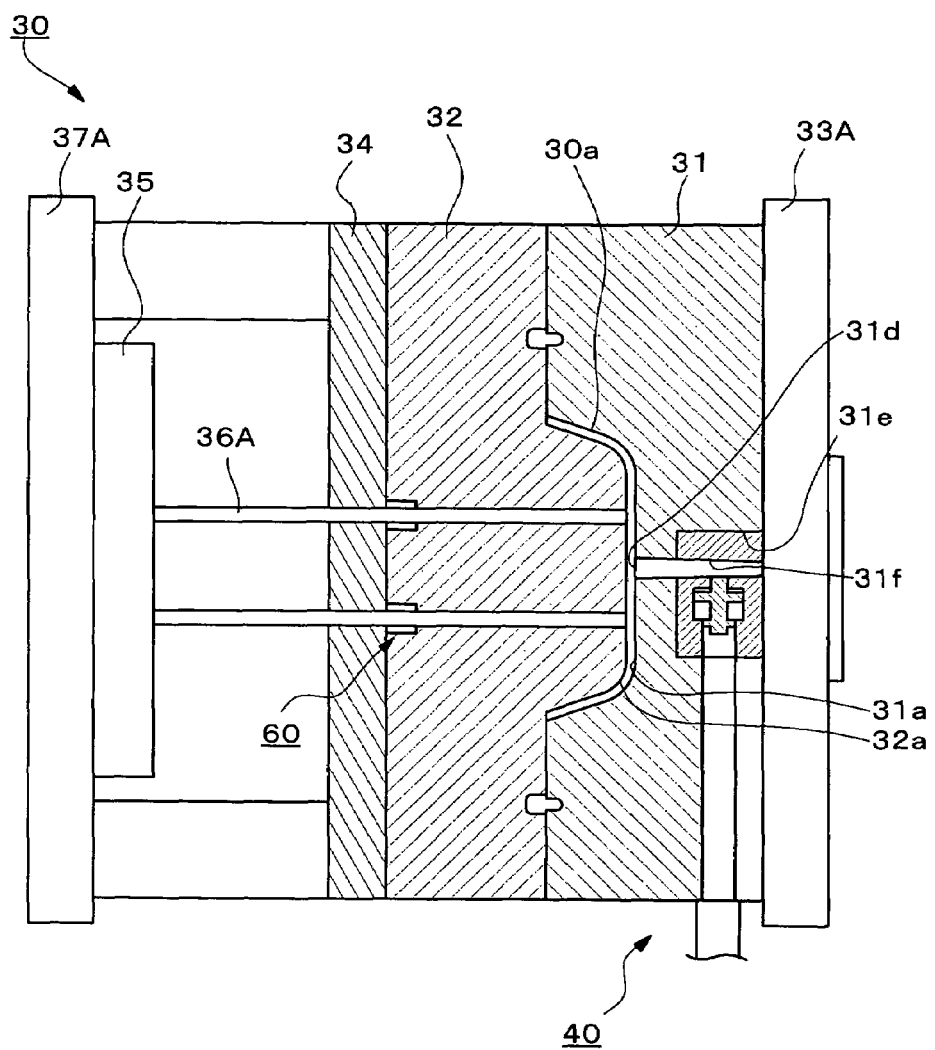

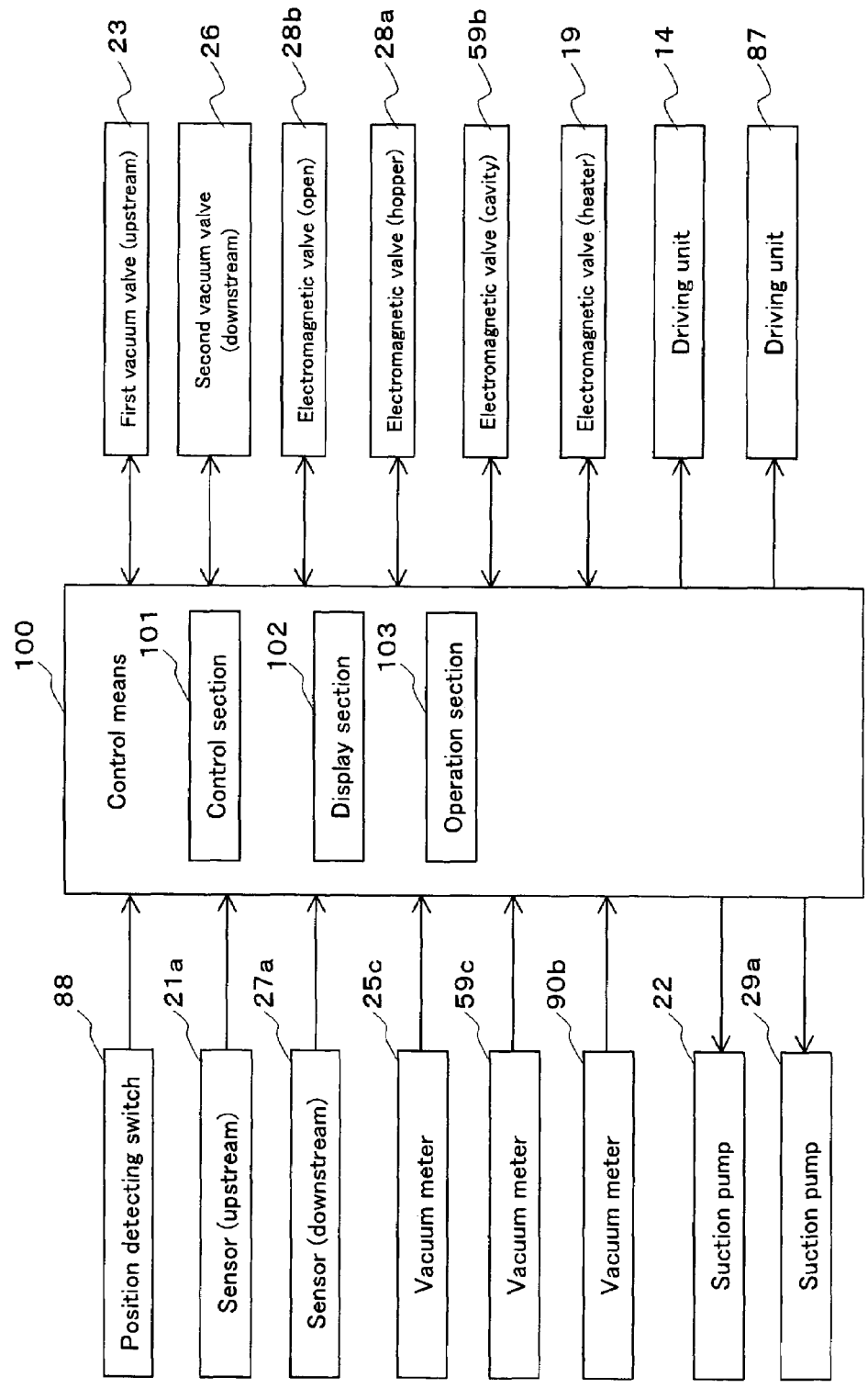
[FIG. 3]

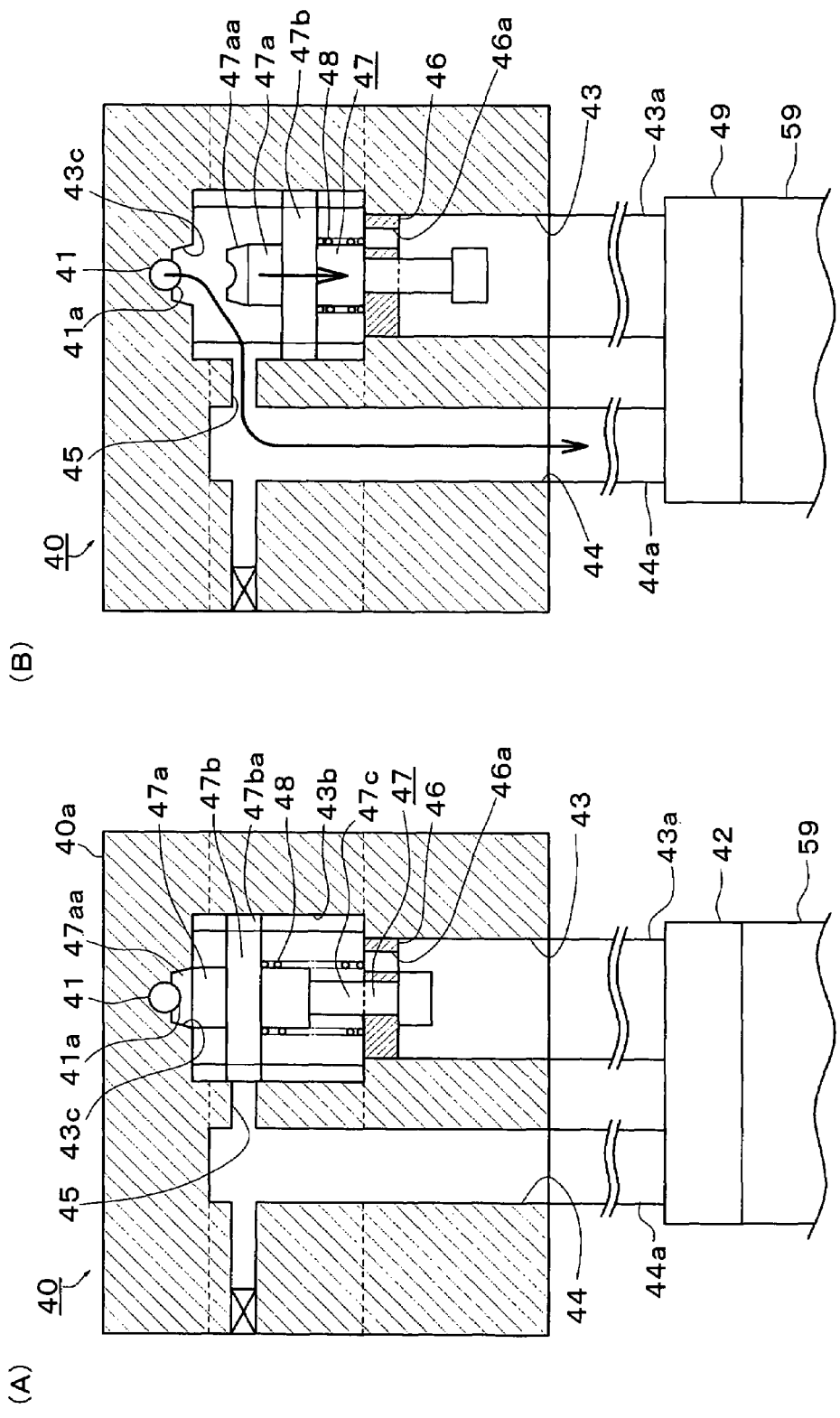
[FIG. 4]

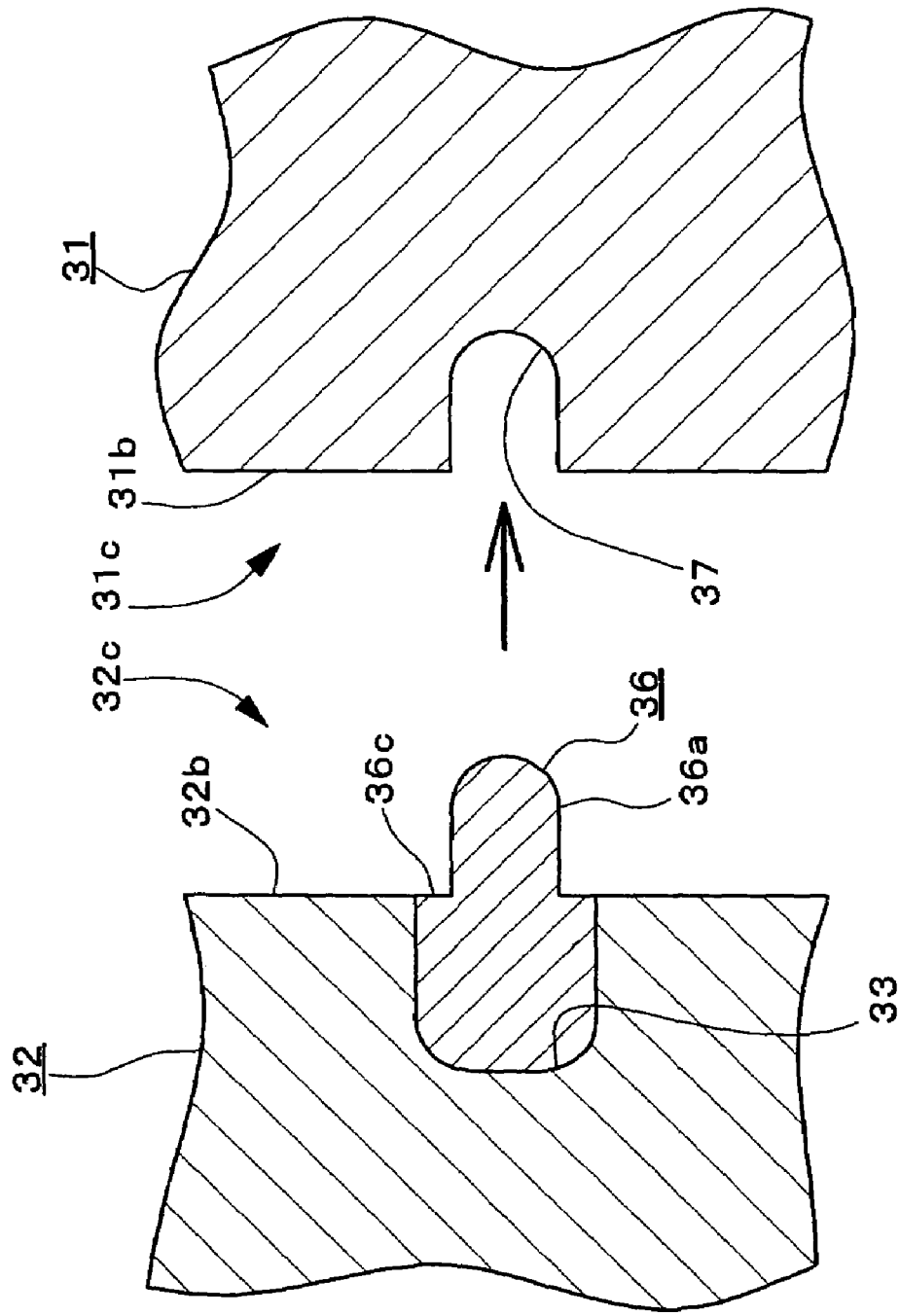

[FIG. 6]
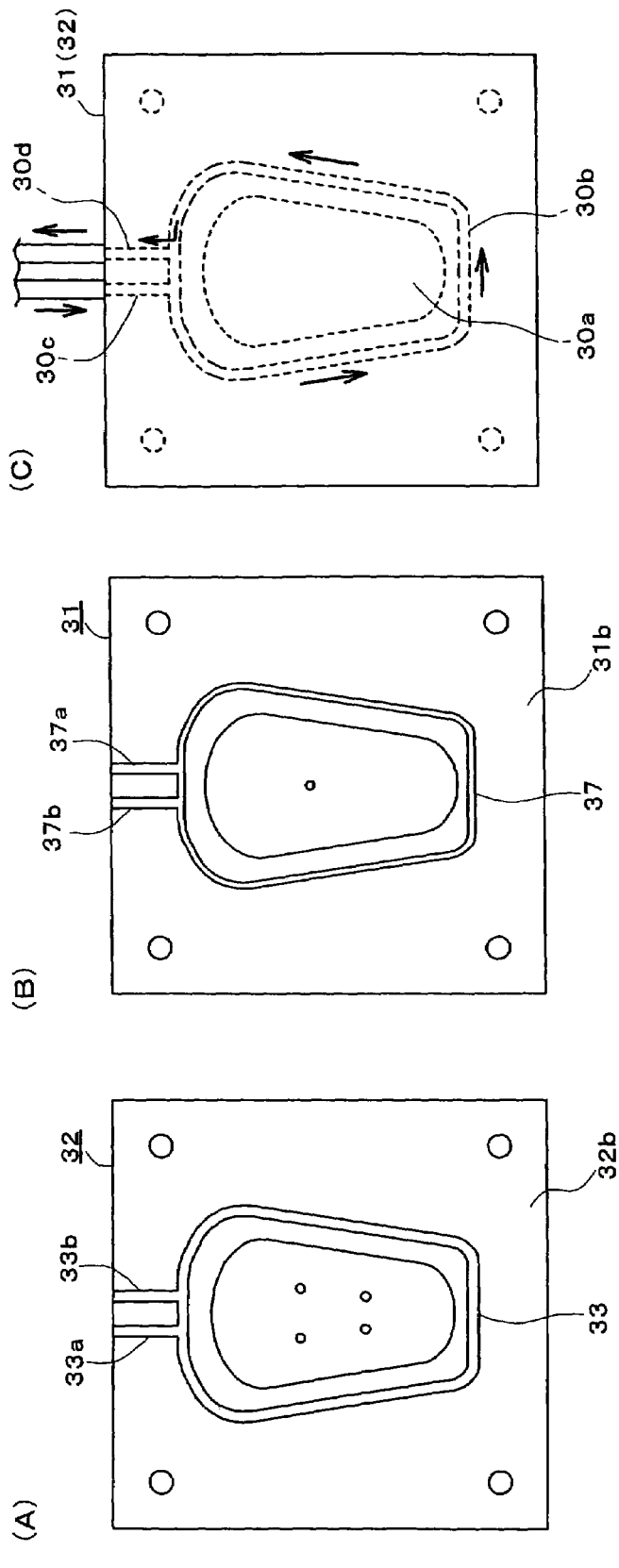

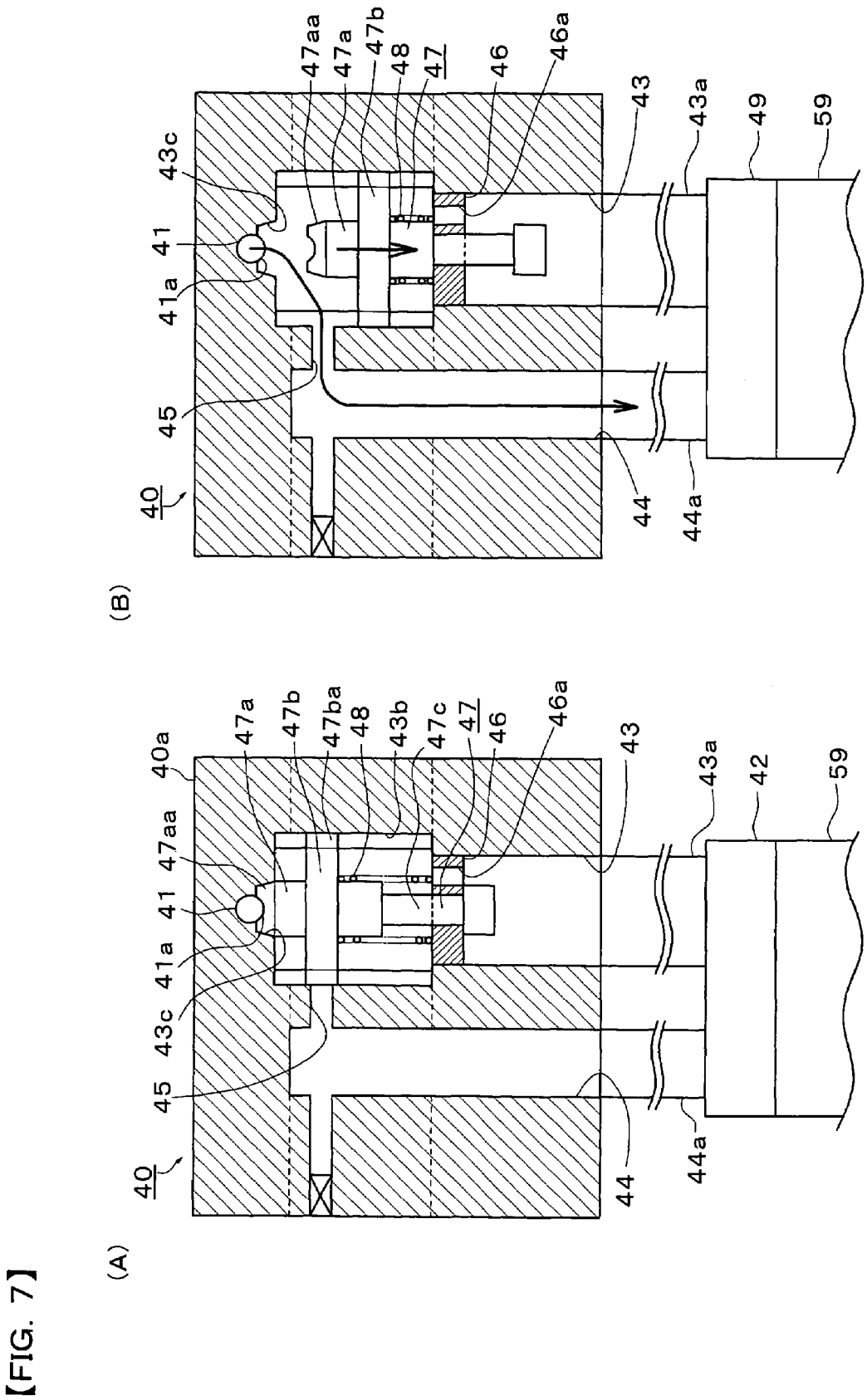

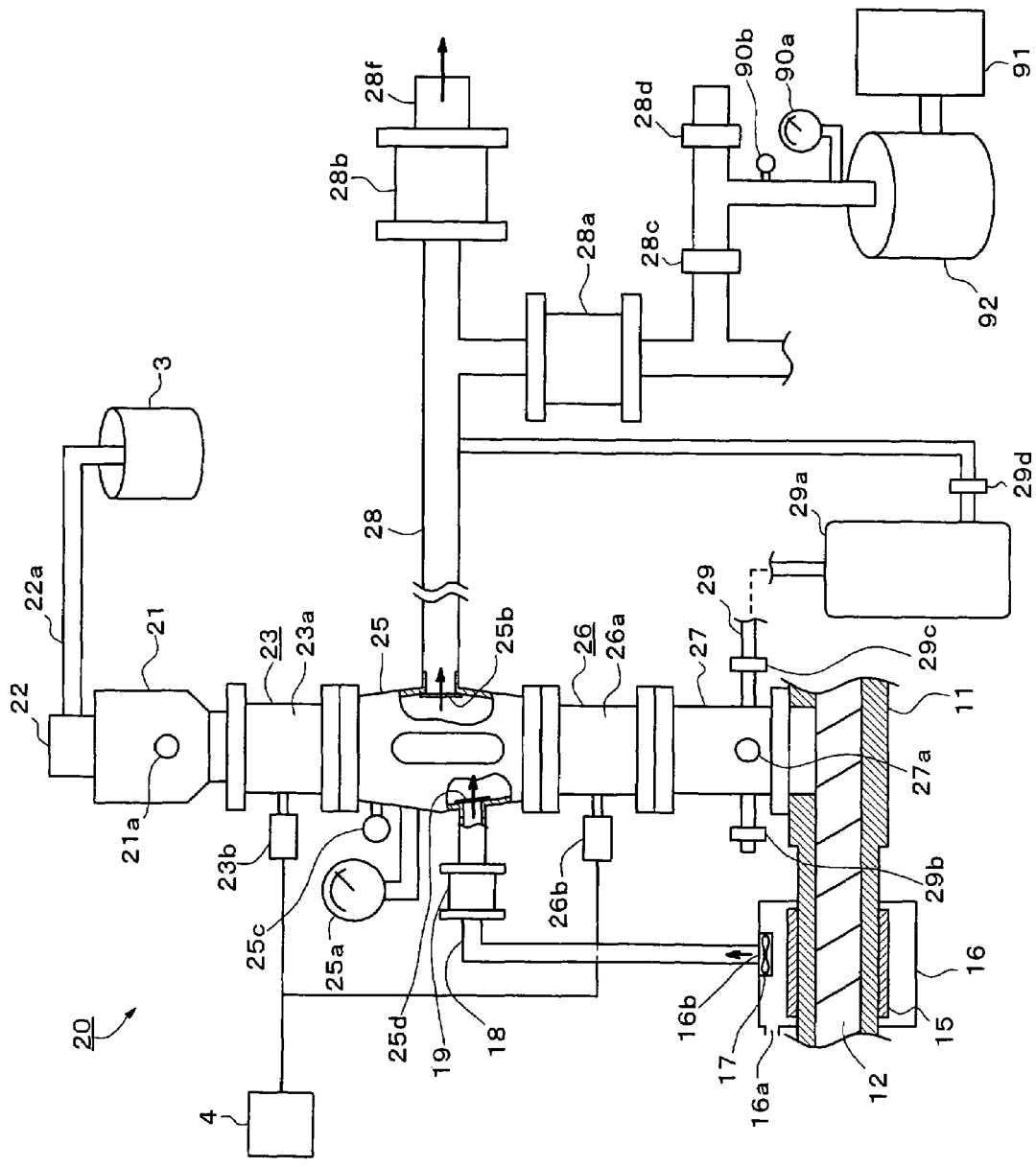
[FIG. 8]

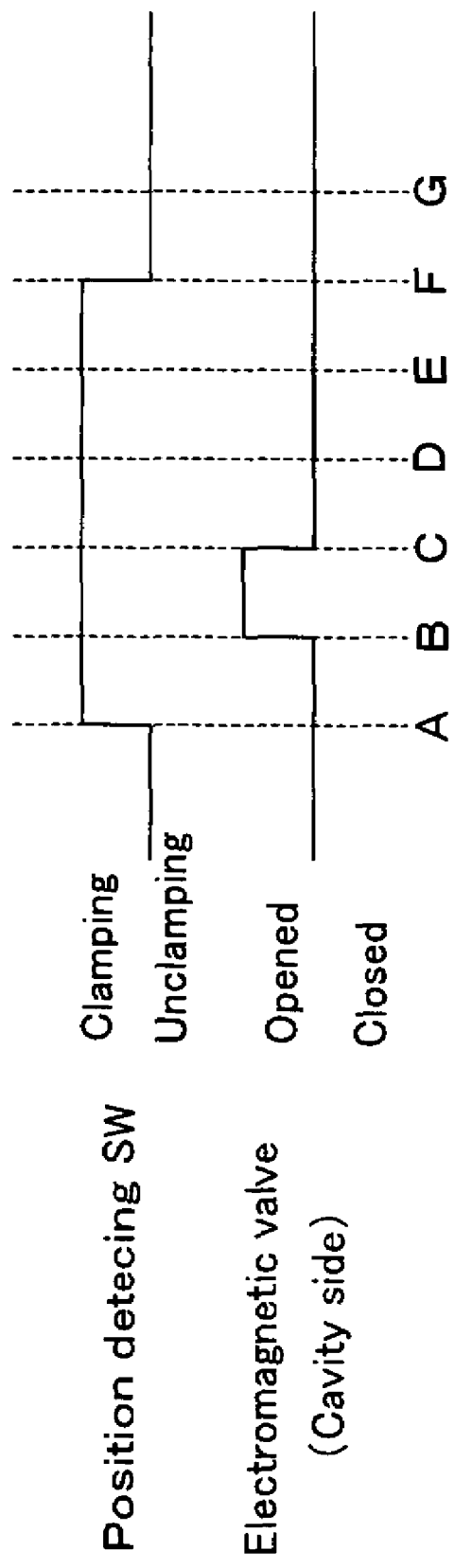
[FIG. 9]

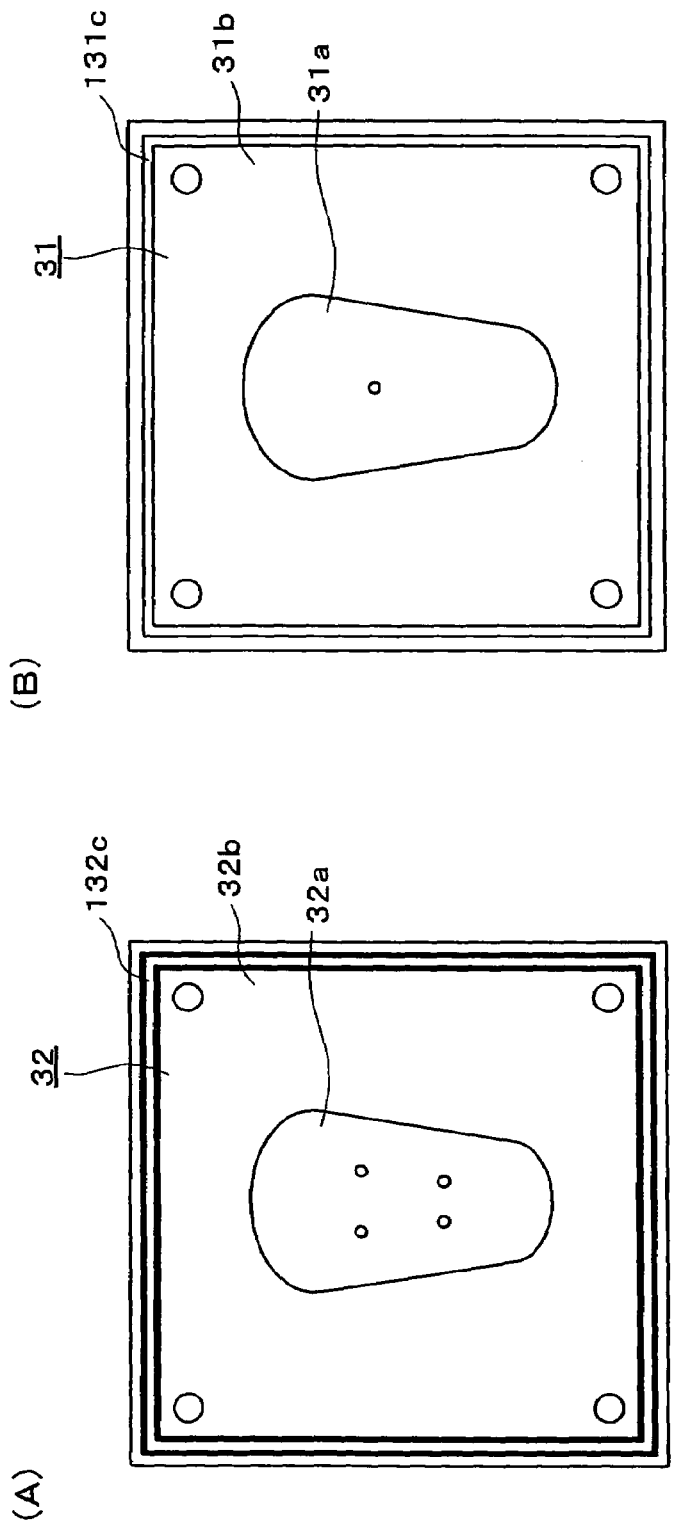
[FIG. 10]

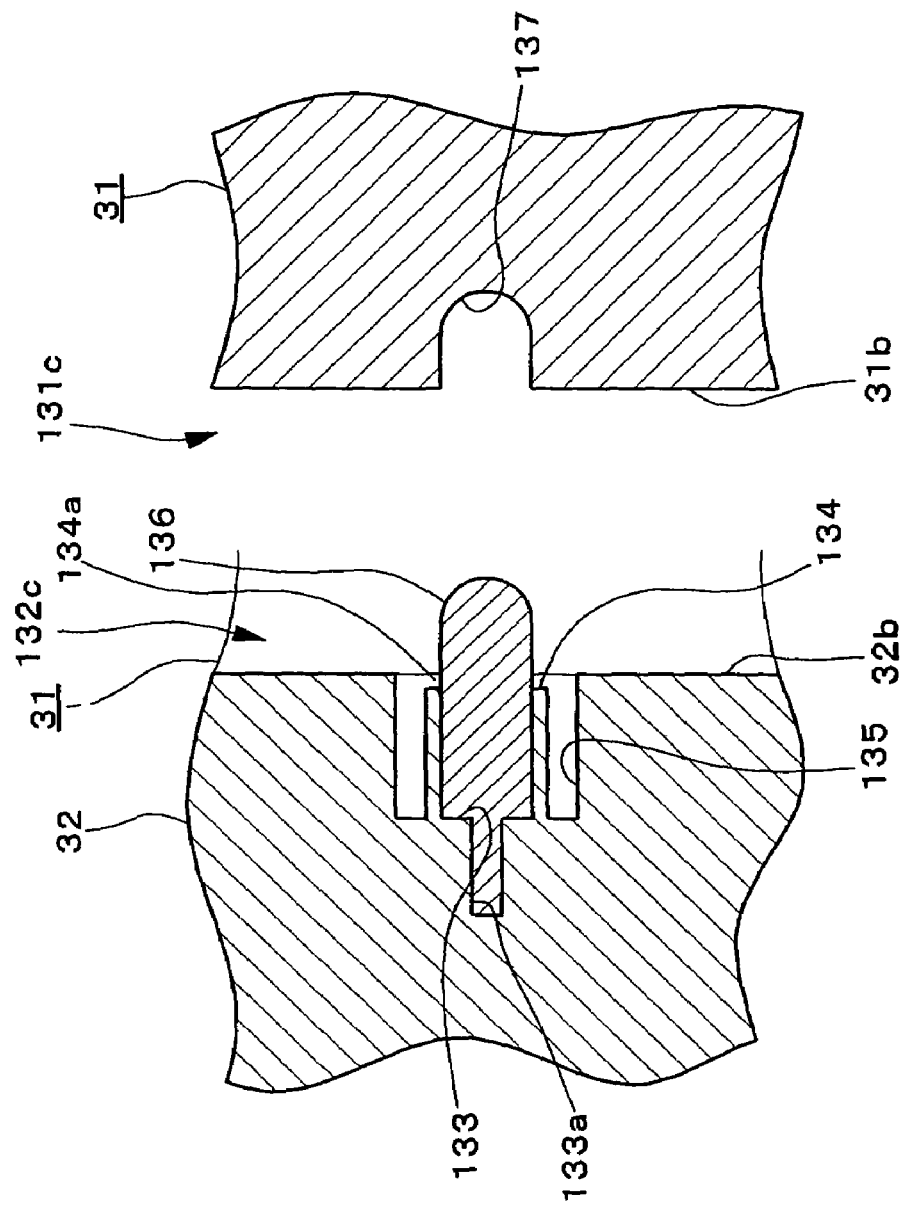
[FIG. 11]

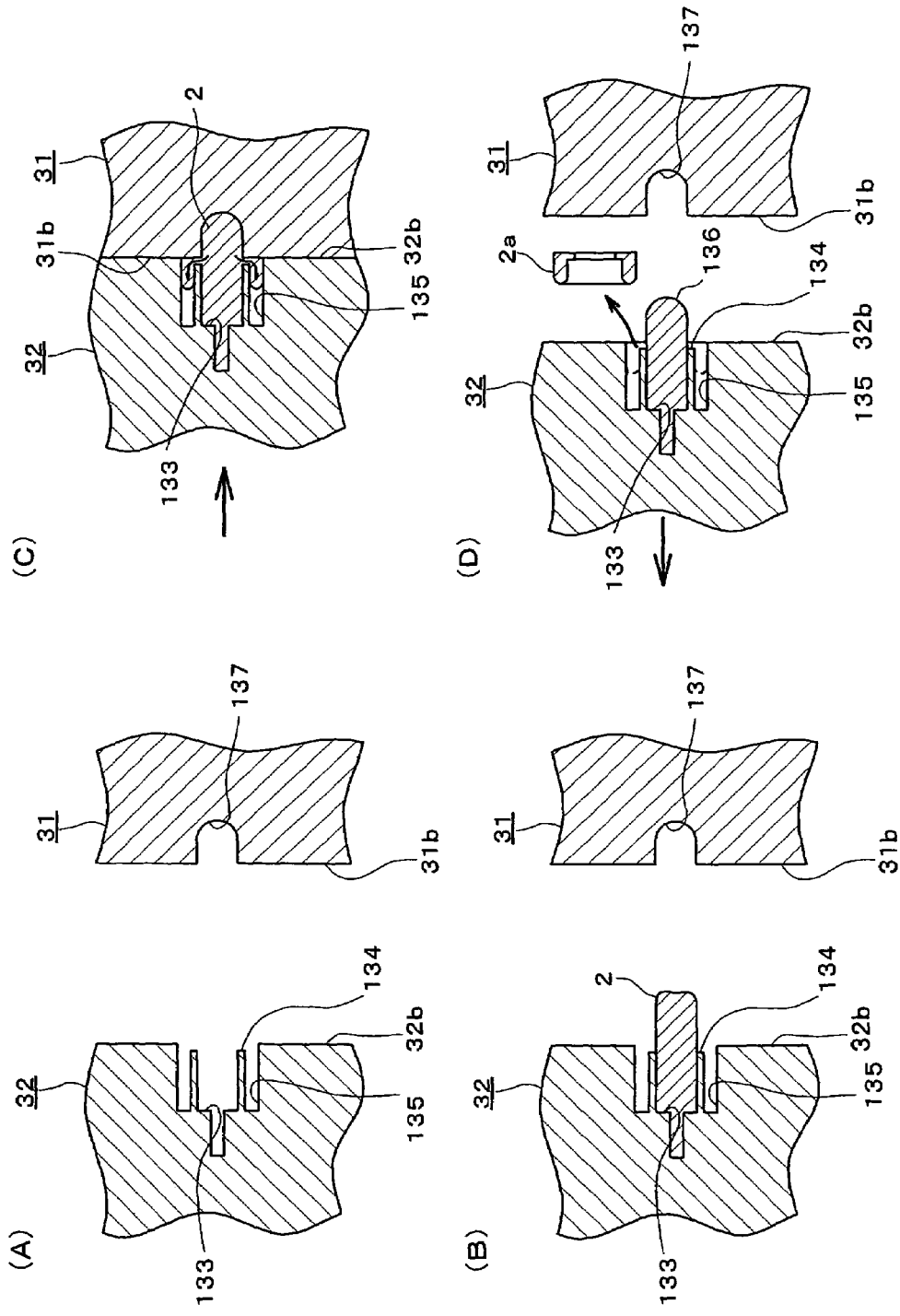
[FIG. 12]

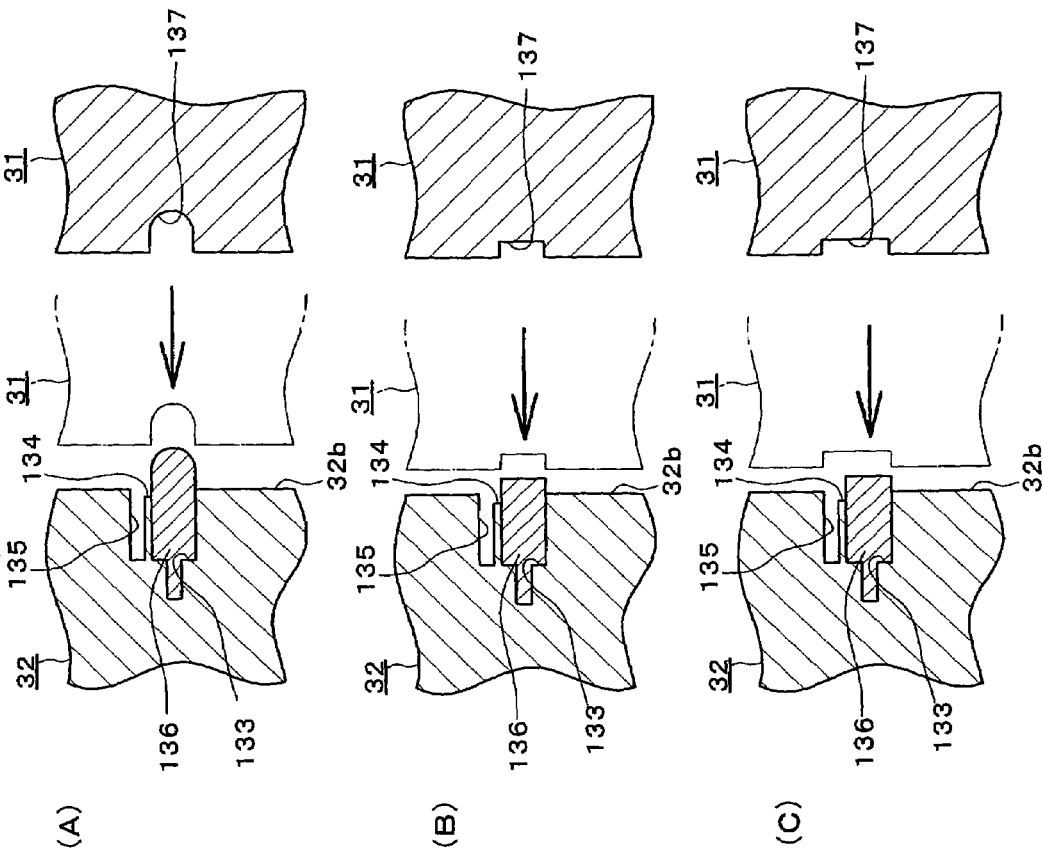
[FIG. 13]

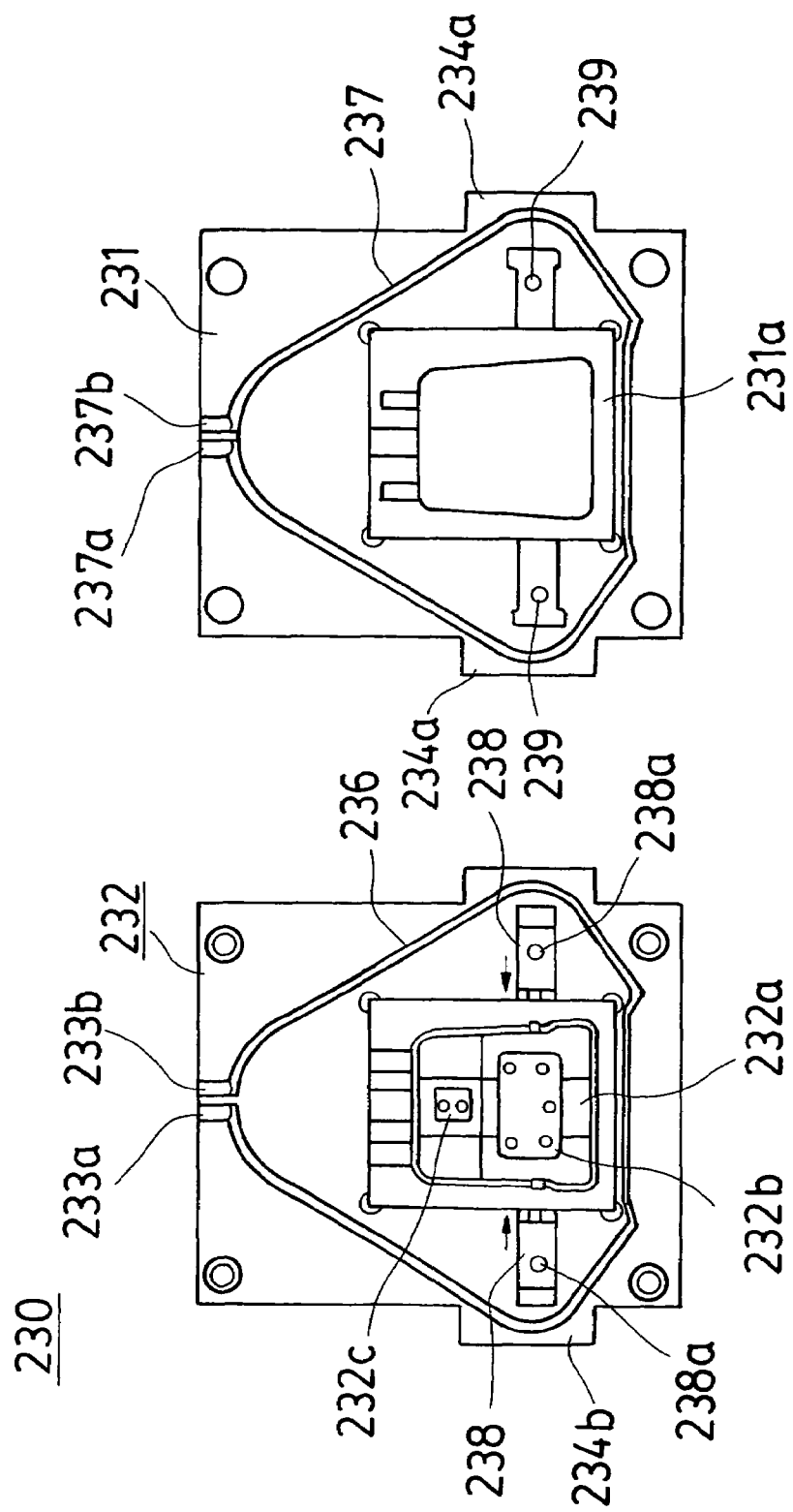
[FIG. 14]

[FIG. 15]
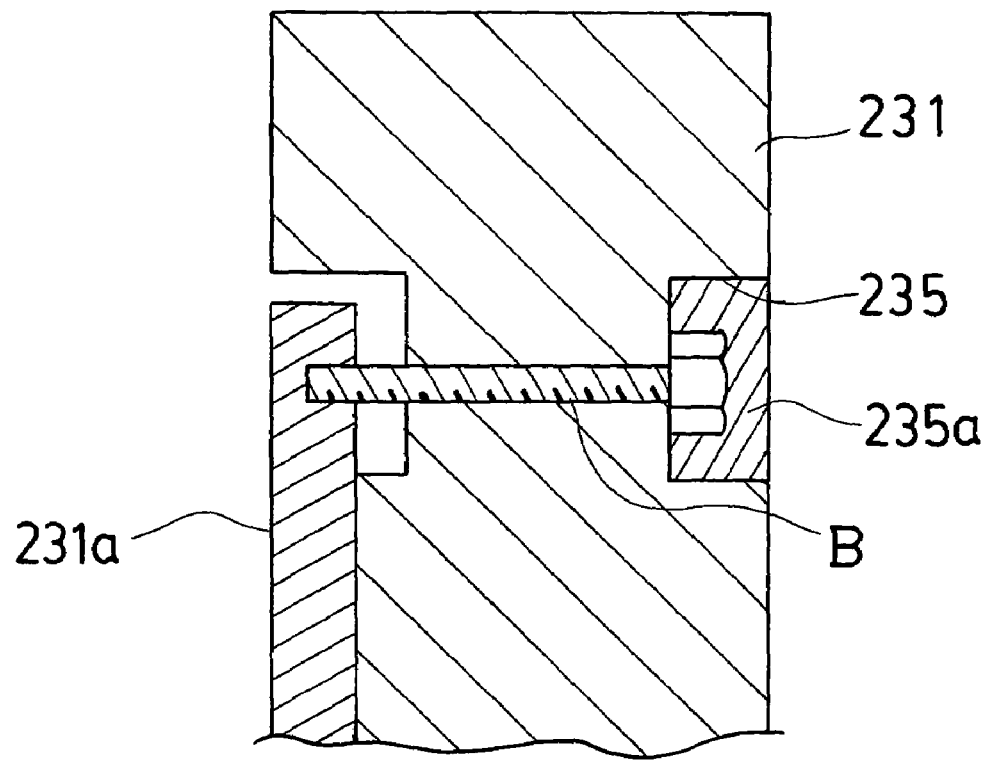

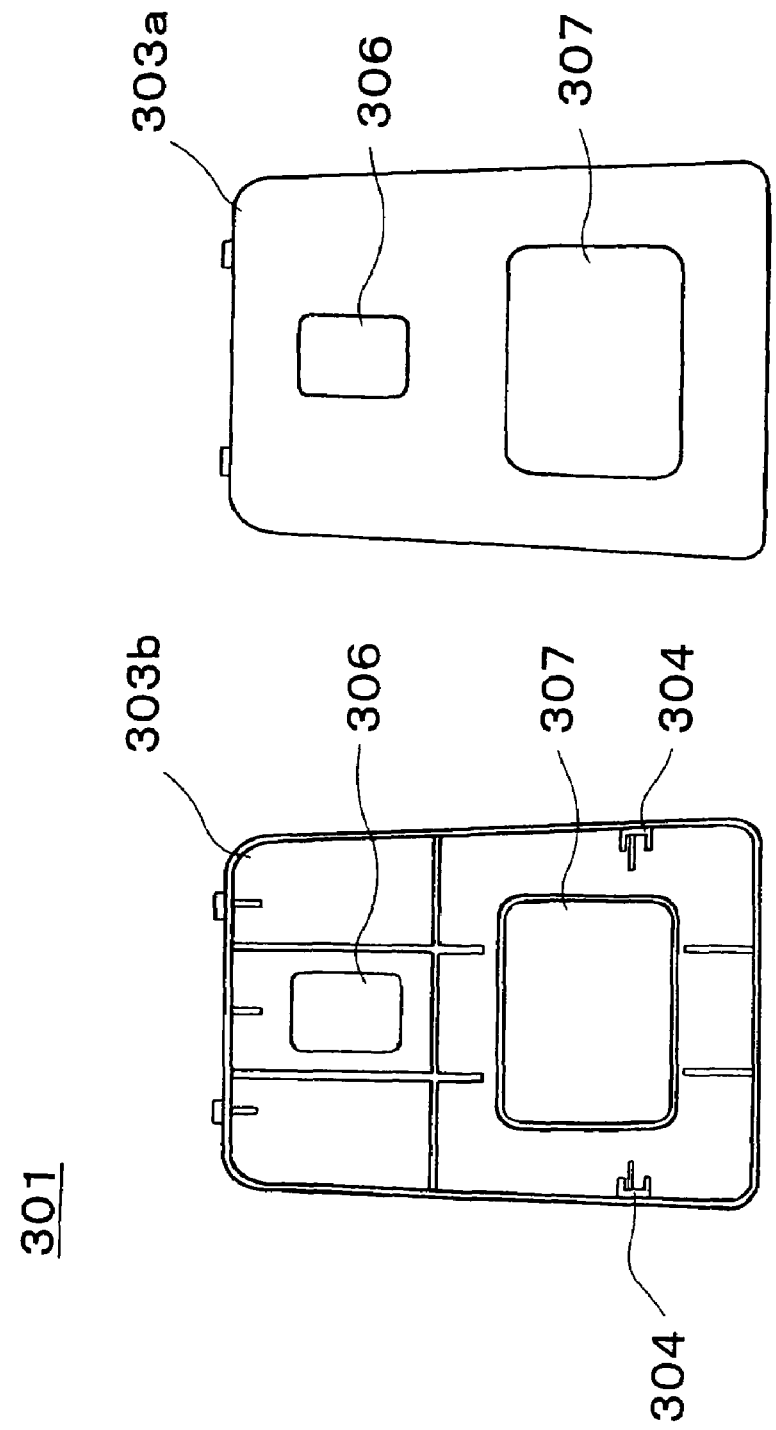

[FIG. 17]
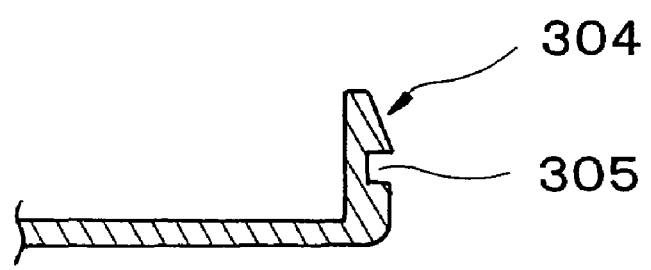

[FIG. 18]
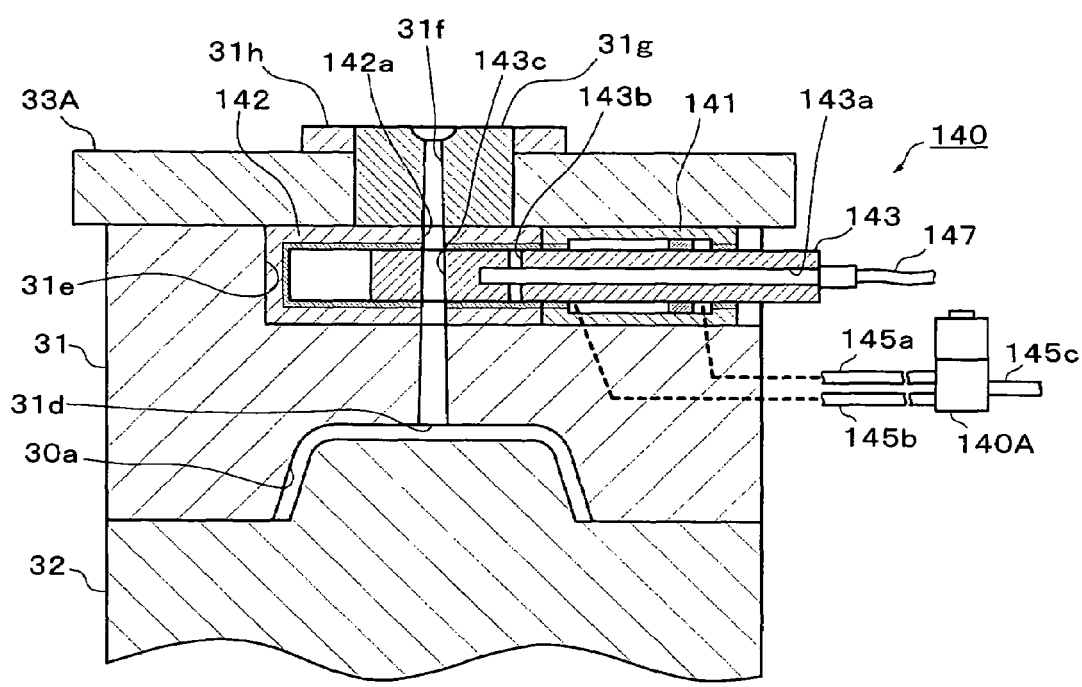

[FIG. 19]
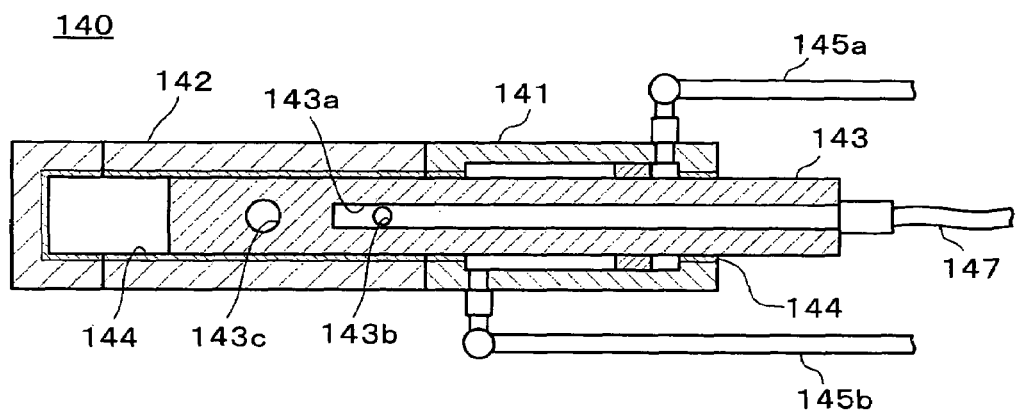

[FIG. 20]
(A)
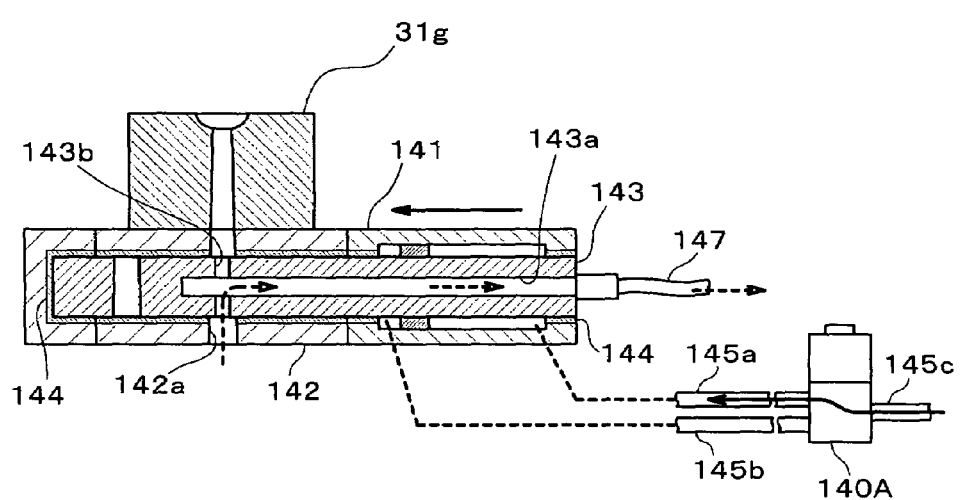
(B)
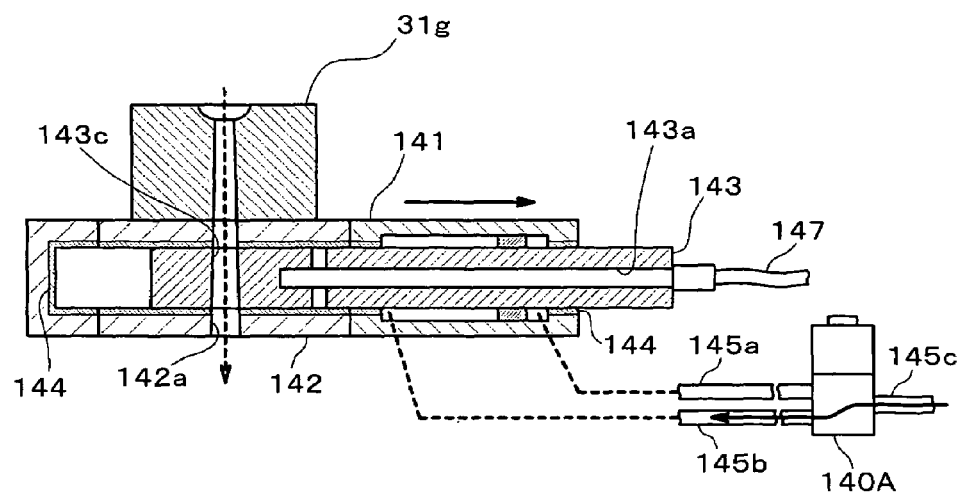

INJECTION MOLD HAVING A SWITCHING VALVE

This application is a National Phase Application of International Application No. PCT/JP2005/011385, filed Jun. 21, 2005, which claims the benefit under 35 U.S.C. 119 (a-e) of Japanese Application No. 2004-182992 filed Jun. 21, 2004, Japanese Application No. 2004-235928 filed Aug. 13, 2004, Japanese Application No. 2005-128690 filed Apr. 26, 2005, Japanese Application No. 2005-128700 filed Apr. 26, 2005, which is herein incorporated by reference.

TECHNICAL FIELD

The present invention relates to an injection mold capable of performing injection molding while keeping a cavity and a resin material in a vacuum state, a method of manufacturing the mold, an injection molding apparatus, and an injection molding method.

BACKGROUND ART

A mold used for vacuum molding capable of bringing a cavity into a vacuum state after the mold is clamped is known as a conventional one.

Patent Document 1: Japanese Published Unexamined Patent Application No. 2002-225096
Patent Document 2: Japanese Published Unexamined Patent Application No. 2001-129833

A mold disclosed by Patent Document 1 (2002-225096) or Patent Document 2 (2001-129833) is composed of a stationary mold half and a movable mold half. An annular groove is formed in a parting surface of one of the stationary and movable mold halves. An O-ring is disposed in the groove.

When the stationary mold half and the movable mold half are clamped together, the O-ring comes into elastic contact with the parting surface of one of the mold halves, so that a cavity formed inside the groove can be kept in a state of being sealed off from the outside. Under this state, a vacuum pump communicating with the cavity is operated, and, as a result, the cavity can create a vacuum.

For example, the mold disclosed by Patent Document 1 (2002-225096) has a vent, which is an opening used for vacuuming, formed in a contact surface between the stationary mold half and the movable mold half. The vent is opened toward a cavity formed by the stationary and movable mold halves, and leads to a vacuum apparatus through an exhaust passage bored in the movable mold half. The thus structured mold can keep the cavity in a vacuum state by being clamped and then allowing the vacuum apparatus to evacuate air from the cavity through the vent and the exhaust passage.

However, a conventional problem resides in the fact that, since the mold uses the O-ring by which the cavity is sealed off, the O-ring is broken or reduced in elasticity by repeatedly performing a molding operation, and hence a drop in sealability makes it impossible to maintain the sealed state. Another conventional problem is that, since the mold has the O-ring sandwiched between the stationary mold half and the movable mold half when clamped, there is a need to, for example, adjust a clamping pressure when clamped, and hence much time is consumed for molding, and restrictions are imposed on the molding operation.

Additionally, since the mold disclosed by Patent Document 1 (2002-225096) has the vent opened toward the cavity, there has been a fear that molten resin will enter the vent when the molten resin is injected into the cavity. Still additionally, disadvantageously, a molded article has a part formed by the vent that needs to be processed, thereby increasing man-hours.

The present invention has been made in consideration of these problems. It is therefore an object of the present invention to provide an injection mold capable of maintaining sealability even if a molding operation is repeatedly performed, and provide a method of manufacturing the mold. It is another object of the present invention to provide an injection mold capable of reliably keeping a cavity in a vacuum state and capable of producing molded articles at low cost without creating extra work for the molded articles after completing the molding operation, an injection molding apparatus, and an injection molding method.

DISCLOSURE OF INVENTION

A mold of the present invention is characterized by comprising a stationary mold half and a movable mold half, wherein one of the stationary mold half and the movable mold half has an annular groove surrounding a cavity formed by the stationary mold half and the movable mold half; a mold seal member made of silicone rubber is disposed in the annular groove; the other one of the stationary mold half and the movable mold half has a mold seal groove facing the mold seal member; the mold seal member has a fitting part that protrudes from either a contact surface of the stationary mold half or a contact surface of the movable mold half and that is capable of being fitted into the mold seal groove; and the fitting part is formed to have substantially the same shape in cross-section as the mold seal groove.

As mentioned above, in the present invention, to seal the cavity of the mold, a groove part is formed in one of the stationary mold half and the movable mold half, and a mold seal member made of silicone rubber is formed in the groove part. On the other hand, a mold seal groove into which the mold seal member is fitted is formed in the other one of the stationary mold half and the movable mold half. Therefore, when clamped, the mold seal member enters the mold seal groove, and hence the airtightness of the cavity can be reliably maintained.

When the cavity is evacuated of air, a pressure difference between the inside and the outside of the cavity causes the mold seal member to be sucked into contact with the mold seal groove. Accordingly, the mold seal member and the mold seal groove are brought into close contact with each other, and the cavity can be reliably sealed.

Advantageously, the sealing member neither deforms nor is broken when clamped, unlike a conventional mold, by pressing the mold seal member made of silicone rubber against the mold seal groove of the other mold half by use of a pressure difference so as to secure sealability. Therefore, even if a molding operation is repeatedly performed, sealability can be secured for a long term by the mold seal member and the mold seal groove, and hence labor hours required to repeatedly perform a molding operation can be saved.

If the mold has a slide block used to form an undercut part, the mold seal member is provided more outside than the slide block.

Preferably, the stationary mold half and the movable mold half have insert members serving to form a molding surface, wherein the insert member is fixed from a backside of the mold by a screw member disposed in a screw hole bored in the stationary mold half and in the movable mold half, and the screw hole is provided with a sealing member made of silicone rubber. In the mold of the present invention, the sealing member is disposed at all of the parts causing the contact of the cavity with external air. Therefore, the airtightness of the cavity can be reliably maintained.

A mold manufacturing method of the present invention is a method of manufacturing a mold comprising a stationary mold half, a movable mold half, and a cavity formed by the stationary mold half and the movable mold half, and is characterized by comprising the steps of forming an annular groove surrounding the cavity in a contact surface of one of the stationary mold half and the movable mold half, forming a mold seal groove facing the annular groove in a contact surface of the other one of the stationary mold half and the movable mold half, and forming two communication grooves leading to an outside of the mold from one of or both of the annular groove and the mold seal groove; clamping the stationary mold half and the movable mold half together and then forming an annular space by allowing the annular groove and the mold seal groove to coincide with each other; injecting liquid silicone rubber from one of the two communication grooves into the annular space and performing a vacuum operation through the other one of the two communication grooves; and hardening the silicone rubber with which the groove is filled.

Thus, according to the mold manufacturing method of the present invention, since air evacuation is performed, the mold seal member can be easily and efficiently formed by filling the groove parts formed in the mold with silicone rubber.

A mold for injection molding of the present invention is an injection mold having a cavity formed by a stationary mold half and a movable mold half, and is characterized in that the stationary mold half has an exhaust section communicating with a vacuum exhaust means for evacuating air from the cavity, and a switching valve provided in the exhaust section performs switching between an open position that allows the vacuum exhaust means and the cavity to communicate with each other through a gate part used to inject molten resin into the cavity and a closed position that does not allow the vacuum exhaust means and the cavity to communicate with each other therethrough.

As mentioned above, the mold of the present invention has the exhaust section used to evacuate air from the cavity formed by the stationary mold half and the movable mold half. The exhaust section has the switching valve that allows the cavity to communicate with the vacuum exhaust means through the gate part used to inject molten resin into the cavity. With this structure, the mold of the present invention can remove air occupying the cavity through the gate part.

If air is discharged through the gate part used to inject molten resin in this way, there is no need to connect the exhaust section to the cavity at a position differing from that of the gate part. Therefore, traces defiled by the exhaust section never remain at an end or a surface of a molded article, and it becomes unnecessary to machine the molded article after a molding operation is completed. Additionally, since the cavity and the exhaust section are not required to communicate with each other at a position differing from that of the gate part, the exhaust section can be mounted on the mold in a standard manner without depending on the shape of the molded article, and the cavity can be reliably evacuated of air.

In the present invention, the switching valve can comprise a main body that leads to a sprue provided in the stationary mold half through an exhaust hole and that has an actuation space leading to the vacuum exhaust means; and a valve element capable of performing switching between the open position and the closed position while moving back and forth inside the actuation space, wherein a hole closing part that closes the exhaust hole is provided at a top end of the valve element, and the switching valve allows the sprue and the vacuum exhaust means to communicate with each other through the actuation space by closing the exhaust hole with the hole closing part in the closed position and by separating the hole closing part from the exhaust hole in the open position.

Thus, since the actuation space communicates with the sprue of the stationary mold half and the vacuum exhaust means, the cavity and the vacuum exhaust means are allowed to communicate with each other from the side of the gate part through the actuation space and the sprue, and hence air in the cavity can be discharged through the gate part. Therefore, there is no need to connect the exhaust section to the cavity at a position differing from that of the gate part. Therefore, traces defiled by the exhaust section never remain at an end or a surface of a molded article. Additionally, the exhaust section can be mounted on the mold in a standard manner without depending on the shape of the molded article.

In the present invention, the hole closing part is provided at the top end of the valve element that moves back and forth inside the actuation space. Based on the fact that the hole closing part moves back and forth together with the valve element, the sprue and the vacuum exhaust means are allowed to communicate with each other through the actuation space by closing the exhaust hole in the closed position and by separating the hole closing part from the exhaust hole in the open position. Thus, based on a simple operation in which the valve element is moved back and forth, switching can be performed between a state in which the sprue is allowed to communicate with the vacuum exhaust means and a state in which the sprue is not allowed to communicate therewith.

In the present invention, the switching valve comprises a main body having an actuation space formed to intersect with a sprue provided in the stationary mold half; and a valve element capable of performing switching between the open position and the closed position while airtightly moving back and forth inside the actuation space, wherein the valve element has a first hole that constitutes a part of the sprue in the closed position and a second hole one end of which leads to the gate part through the sprue and an opposite end of which leads to the vacuum exhaust means in the open position.

Since the valve element that airtightly moves back and forth inside the actuation space is provided with the first hole that constitutes a part of the sprue in the closed position as mentioned above, resin can be injected into the mold through the sprue in the closed position. Additionally, since the valve element is provided with the second hole that allows the gate part and the vacuum exhaust means to communicate with each other through the sprue in the open position, air can be discharged through the gate part used to inject resin in the open position. Therefore, there is no need to connect the exhaust section to the cavity at a position differing from that of the gate part. Therefore, traces defiled by the exhaust section never remain at an end or a surface of a molded article. Additionally, the exhaust section can be mounted on the mold in a standard manner without depending on the shape of the molded article.

Additionally, in the present invention, the valve element moves back and forth inside the actuation space that intersects with the sprue, and the sprue is allowed to communicate with the first hole or the second hole in accordance with the position of the valve element. Thus, based on a simple operation in which the valve element is moved back and forth, switching can be performed between a state in which the sprue is allowed to communicate with the vacuum exhaust means and a state in which the sprue is not allowed to communicate therewith.

An injection molding apparatus of the present invention is characterized by comprising the mold; a clamping means capable of clamping the mold; an injection means for injecting molten resin into the mold; and a vacuum exhaust means for performing a vacuum operation. With this structure, it becomes possible to provide an injection molding apparatus capable of discharging air occupying the cavity through the gate part.

An injection molding method of the present invention is a method of producing a molded article by injecting molten resin into a cavity in an injection molding apparatus, and is characterized in that the injection molding apparatus comprises a mold composed of a stationary mold half and a movable mold half, a clamping means capable of clamping the mold, an injection means for injecting molten resin into the mold, and a vacuum exhaust means for performing a vacuum operation, wherein the mold includes an exhaust section having a switching valve capable of performing switching between an open position that allows the vacuum exhaust means and the cavity formed by the stationary mold half and the movable mold half to communicate with each other through a gate part of the mold and a closed position that does not allow the vacuum exhaust means and the cavity to communicate with each other therethrough, and the injection molding method comprises the steps of evacuating air from the cavity through the gate part of the mold by actuating the vacuum exhaust means in a state in which the mold is clamped and in which the switching valve is switched to the open position; and injecting molten resin into the cavity in a state in which the switching valve is switched to the closed position and in which the cavity is kept in a vacuum state.

As mentioned above, the injection molding method of the present invention is performed which includes the steps of evacuating the cavity of air by reducing the pressure of the inside of the cavity while discharging air occupying the cavity through the gate part used to inject resin in a state in which the mold is clamped and injecting molten resin while keeping the cavity in a vacuum state. In other words, the gate part used to inject molten resin is allowed to communicate with the vacuum exhaust means, and the cavity is brought to a vacuum state while discharging air through the gate part. Thereafter, the switching valve is switched to allow the gate part to communicate with the injection means through the sprue, and molten resin is injected into the cavity being in a vacuum state.

Therefore, in the present invention, there is no need to connect the exhaust section to the cavity at a position differing from that of the gate part. Therefore, traces defiled by the exhaust section never remain at an end or a surface of a molded article, and it becomes unnecessary to machine the molded article after a molding operation is completed. Additionally, the exhaust section can be mounted on the mold in a standard manner without depending on the shape of the molded article, and the cavity can be reliably evacuated of air.

BRIEF DESCRIPTION OF DRAWINGS

FIG. 1 is an explanatory drawing of an injection molding apparatus of the present invention.

FIG. 2 is an explanatory drawing of a mold of the present invention.

FIG. 3 is an explanatory drawing of a control means of the present invention.

FIG. 4A and FIG. 4B are explanatory drawings of the mold of the present invention.

FIG. 5 is a sectional explanatory drawing of a mold seal member of the present invention.

FIG. 6A, FIG. 6B, and FIG. 6C are explanatory drawings showing a method of forming the mold seal member of the present invention.

FIG. 7A and FIG. 7B are explanatory drawings of a mold vacuum valve of the present invention.

FIG. 8 is an explanatory drawing of a material supplying section of the present invention.

FIG. 9 is a timing chart of the mold vacuum valve of the present invention.

FIG. 10A and FIG. 10B are explanatory drawings of a mold according to another embodiment of the present invention.

FIG. 11 is a sectional explanatory drawing of a mold seal member according to another embodiment of the present invention.

FIG. 12A, FIG. 12B, FIG. 12C, and FIG. 12D are explanatory drawings showing a method of forming the mold seal member according to another embodiment of the present invention.

FIG. 13A, FIG. 13B, and FIG. 13C are sectional explanatory drawings of a mold seal member according to another embodiment of the present invention.

FIG. 14 is an explanatory drawing showing a movable mold half and a stationary mold half that are constituents of a mold according to another embodiment of the present invention.

FIG. 15 is an explanatory drawing showing an insert member attached to the mold according to another embodiment of the present invention.

FIG. 16 is an explanatory drawing showing a molded article formed by a mold according to another embodiment of the present invention.

FIG. 17 is a partially enlarged view of FIG. 16.

FIG. 18 is an explanatory drawing of a mold vacuum valve according to another embodiment of the present invention.

FIG. 19 is an explanatory drawing of a mold vacuum valve according to another embodiment of the present invention.

FIG. 20A and FIG. 20B are explanatory drawings of a mold vacuum valve according to another embodiment of the present invention.

BEST MODE FOR CARRYING OUT THE INVENTION

Embodiments of the present invention will be herein after described with reference to the accompanying drawings. Note that the present invention is not limited to members, arrangements, etc., described below, and, of course, can be carried out in variously modified forms without departing from the gist of the present invention.

First, a description will be given of the whole structure of an injection molding apparatus S according to this embodiment. FIG. 1 is a sectional explanatory drawing of the injection molding apparatus S of the present invention. As shown in FIG. 1, the injection molding apparatus S is composed mainly of an injection means 10, a mold 30, a clamping means 80, a vacuum exhaust means 90, and a control means 100. The injection means 10 and the clamping means 80 are disposed on a mounting base 1. The mold 30 is attached to the clamping means 80.

The injection means 10 used in this embodiment is a screw in-line type injection molding machine, and is composed of a cylinder 11, a nozzle 13, a driving unit 14, and a material supplying section 20 that supplies a resin material into the cylinder 11. The cylinder 11, the nozzle 13, and the driving unit 14 constitute an injecting portion.

The driving unit 14 includes a rotary drive section 14a consisting of a motor by which a screw 12 disposed in the cylinder 11 is rotated and a speed reduction mechanism, an injection cylinder device 14*b* that injects molten resin contained in the cylinder 11 into the mold 30 by pushing out the screw 12, and a shift cylinder that brings the nozzle 13 into contact with a sprue 31*f* or detaches the nozzle 13 therefrom while moving the cylinder 11 rightwardly and leftwardly.

In the cylinder 11 according to this embodiment, a vacuum seal 11*a* is disposed behind an opening through which the material supplying section 20 and the cylinder 11 communicate with each other (i.e., disposed at the right side in FIG. 1). The screw 12 is slidably inserted in the vacuum seal 11*a*. The space between the inside of the cylinder 11 and the driving unit 14 is sealed with the vacuum seal 11*a*.

The cylinder 11 is heated by a band heater 15. A resin material is supplied into the cylinder 11 through the material supplying section 20, is then kneaded and plasticized by the screw 12 that is rotationally driven by the rotary drive section 14*a*, and is pushed forwardly. When the injection cylinder device 14*b* is actuated in this state, the screw 12 is pushed toward the mold 30, so that the molten resin contained in the forward part of the cylinder 11 is injected into a cavity 30*a* of the mold 30 through the nozzle 13.

As shown in FIG. 1 and FIG. 2, the mold 30 is composed mainly of a stationary-side mounting plate 33A, a stationary mold half 31 attached to the stationary-side mounting plate 33A, a movable mold half 32 disposed so as to face the stationary mold half 31, a backboard 34 supporting the movable mold half 32 from therebehind, a movable-side mounting plate 37A connected to the backboard 34 with a spacer block there between, an ejector plate 35 movably disposed between the backboard 34 and the movable-side mounting plate 37A, and ejector pins 36A each of which has its base part fixed to the ejector plate 35. The cavity 30*a* to produce a molded article is formed by clamping the stationary mold half 31 and the movable mold half 32 together.

A mold vacuum valve 40 serving as an exhaust section described later is incorporated into the stationary mold half 31. The stationary mold half 31 has a concave part 31*e* at its side face being in contact with the stationary-side mounting plate 33A. The mold vacuum valve 40 serving as the exhaust section of the present invention is attached to this concave part 31*e*. The mold vacuum valve 40 is formed so that switching can be performed between an operation in which a gate 31*d* of the stationary mold half 31 is allowed to communicate with the side of the nozzle 13 and an operation in which the gate 31*d* thereof is allowed to communicate with the side of the vacuum exhaust means 90.

An electromagnetic valve 59*b* is disposed at a pipe 59 extending from the mold vacuum valve 40 toward a vacuum tank 92 of the vacuum exhaust means 90. The electromagnetic valve 59*b* can make a connection and a disconnection between the mold vacuum valve 40 and the vacuum exhaust means 90. A vacuum sensor 59*a* and a digital vacuum meter 59*c* are disposed on the pipe 59 between the electromagnetic valve 59*b* and the mold vacuum valve 40, and are used to measure atmospheric pressure inside the pipe 59 and atmospheric pressure inside the cavity 30*a* communicating with the pipe 59. The vacuum sensor 59*a* shows atmospheric pressure thereinside by a display part. The vacuum meter 59*c* sends a detection signal showing atmospheric pressure thereinside to the control means 100. This detection signal is controlled and displayed by the control means 100.

The clamping means 80 is composed of a stationary-side die plate 81 fixed to an end of a tie bar 83, a clamping mechanism 86, a movable-side die plate 82 that can be moved toward or away from the stationary-side die plate 81 by the clamping mechanism 86, and a driving unit 87 that drives the clamping mechanism 86 and other elements. The stationary-side die plate 81 supports the stationary-side mounting plate 33A, where as the movable-side die plate 82 supports the movable-side mounting plate 37A. The clamping mechanism 86 is composed of a link mechanism, etc., and can perform positional adjustment of the movable mold half 32 by being driven by the driving unit 87.

The clamping means 80 is provided with a position detecting switch 88 that detects the position of the movable mold half 32. The position detecting switch 88 detects that the movable mold half 32 is in a clamping position, and then sends a position detecting signal to the control means 100.

The driving unit 87 can move the ejector plate 35 toward or away from the movable mold half 32. After the mold is unclamped, the driving unit 87 drives the ejector plate 35 to proceed toward the movable mold half 32, and, as a result, a molded article is detached from the mold surface of the movable mold half 32 by means of ejector pins 36A.

The vacuum exhaust means 90 is used to produce a vacuum in the cavity 30*a* of the mold 30 and in the material supplying section 20, and is composed mainly of a vacuum pump 91 and a vacuum tank 92. The pipeline extending from the vacuum tank 92 is divided at a midway point into two pipes (28 and 59), one of which extends to an electromagnetic valve 28*a* and the other to the electromagnetic valve 59*b*. A vacuum sensor 90*a* and a digital vacuum meter 90*b* are attached to the pipe between the vacuum tank 92 and the electromagnetic valve 28*a* or the electromagnetic valve 59*b*. The vacuum sensor 90*a* displays internal atmospheric pressure by a display part. The vacuum meter 90*b* sends a detection signal obtained by measuring the internal atmospheric pressure to the control means 100. The control means 100 uses this detection signal for controlling and displaying.

The vacuum pump 91 exhausts air from the vacuum tank 92 so that the inside of the vacuum tank 92 can always maintain a predetermined degree of vacuum. In more detail, the control means 100 monitors the degree of vacuum of the inside of the vacuum tank 92 by a detection signal received from the vacuum meter 90*b*. If it is judged that the vacuum tank 92 has had a greater atmospheric pressure value than a predetermined one, the vacuum pump 91 is operated so that the vacuum tank 92 reaches the predetermined degree of vacuum while exhausting air therefrom.

The control means 100 controls the electromagnetic valves 28*a*, 28*b*, and 59*b* so that air is removed from the inside of the cavity 30*a* and the inside of the material supplying section 20 at a predetermined timing. As shown in FIG. 3, the control means 100 is composed mainly of a control section 101, a display section 102, and an operation section 103. The control section 101 stores a control program, and sends an actuation signal to the electromagnetic valves, the driving unit, etc., in response to the reception of an operation signal from the operation section 103 or a position signal, a detection signal, etc., from the electromagnetic valves, sensors, limit switches, or vacuum meters. The display section 102 shows an open-close state of each electromagnetic valve and a device working state, such as an atmospheric pressure value measured by the vacuum meter.

The movable mold half 32 according to this embodiment has a mold seal member made of silicone rubber that is formed in a convex shape and that is disposed in such a way as to surround the cavity 30*a*, where as the stationary mold half 31 has a mold seal groove into which the mold seal member is fitted when clamped. The mold 30 according to this embodiment is structured so that the mold seal member and the mold seal groove are engaged with each other when clamped, so that the cavity 30*a* can be sealed off.

The movable mold half 32 has sliding holes (through-holes) through which the cavity 30a can communicate with the outside (i.e., the side of the backboard 34). The ejector pin 36A used as a slide member can be slid back and forth through the sliding hole. The sliding hole also has a sealing member 60 with which the space between the cavity 30a and the outside is sealed. The ejector pin 36A slides together with the sealing member 60.

(Sealing Structure of Parting Surface)

Next, a description will be given of a structure for sealing the space between the stationary mold half 31 and the movable mold half 32 in this example with reference to FIG. 4 to FIG. 6. In this embodiment, the movable mold half 32 has a mold seal member 36 that is made of silicone rubber and that is formed in a convex shape, where as the stationary mold half 31 has a mold seal groove 37 into which the mold seal member 36 is fitted when clamped. The mold 30 according to this embodiment is structured so that the mold seal member 36 and the mold seal groove 37 are engaged with each other when clamped, so that the cavity 30a can be sealed off.

As shown in FIG. 4A, the movable mold half 32 additionally has a contact surface (i.e., a parting surface) 32b that comes into contact with the stationary mold half 31, an article forming surface 32a that forms the cavity 30a, and a mold seal part 32c formed in such a way as to surround the article forming surface 32a. As shown in FIG. 4B, the stationary mold half 31 additionally has a contact surface (i.e., a parting surface) 31b that comes into contact with the movable mold half 32, an article forming surface 31a that forms the cavity 30a, and a mold seal contact part 31c formed in such a way as to surround the article forming surface 31a.

FIG. 5 is a cross-sectional view of the mold seal contact part 31c and the mold seal part 32c. As shown in FIG. 4A, FIG. 4B, and FIG. 5, the mold seal part 32c has an annular groove 33 formed in such a way as to surround the cavity 30a, an injection groove 33a and a suction groove 33b that cross the contact surface 31b while continuously extending from the annular groove 33 and lead to a side part of the movable mold half 32, and a silicone-rubber-made mold seal member 36 that has elasticity and that is disposed in such a way as to protrude from the annular groove 33 toward the stationary mold half 31. The injection groove 33a and the suction groove 33b are formed to extend from different parts of the annular groove 33 toward the outside.

The annular groove 33 according to this embodiment has a depth of approximately 10 mm and a width of approximately 10 mm. Each of the injection groove 33a and the suction groove 33b has a width of approximately 10 mm, and is formed in a substantially semicircular shape in cross-section. A fitting part 36a protruding from the contact surface 32b of the mold seal member 36 made of silicone rubber has a width of approximately 6 mm and a height of approximately 8 mm from the contact surface 32b. A forward part of the fitting part 36a is formed in a substantially semicircular shape in cross-section.

The mold seal contact part 31c according to this embodiment has a mold seal groove 37 formed at a position facing the mold seal member 36, an injection groove 37a, and a suction groove 37b. The injection groove 37a and the suction groove 37b are formed to face the injection groove 33a and the suction groove 33b, respectively. The mold seal groove 37 according to this embodiment has a depth of approximately 8 mm and a width of approximately 6 mm, and has substantially the same cross-sectional shape as that of the fitting part 36a. Each of the injection groove 37a and the suction groove 37b has a width of approximately 10 mm, and is formed in a substantially semicircular shape in cross-section.

The width of the mold seal groove 37 is set to be smaller than that of the annular groove 33, thereby forming a shoulder 36c of the mold seal member 36 in a step of producing the mold seal member 36 described later. In the mold seal contact part 31c and the mold seal part 32c according to this embodiment, the dimensions of the mold seal member 36 and the mold seal groove 37 are not limited to those mentioned above, and can be appropriately set in accordance with the size of the mold. For example, it is recommended to set the depth of the mold seal groove 37 and the height of the mold seal member 36 to have dimensions ranging from approximately 5 mm to approximately 50 mm.

The thus set dimensions make it possible to, as described later, secure an area in which the mold seal member 36 and the mold seal groove 37 are brought into close contact with each other, and to reliably seal the space between the stationary mold half 31 and the movable mold half 32. Although the width of the mold seal groove 37 is set to be smaller than that of the annular groove 33 in this embodiment, it is permissible to set the mold seal groove 37 and the annular groove 33 to be substantially the same in width.

In this embodiment, the movable mold half 32 has the mold seal part, where as the stationary mold half 31 has the mold seal contact part 31c. However, without being limited to this, the stationary mold half 31 may have the mold seal part, where as the movable mold half 32 may have the mold seal contact part 31c.

Next, a description will be given of a method of forming the mold seal contact part 31c and the mold seal part 32c. First, as shown in FIG. 6A, the contact surface 32b of the movable mold half 32 is cut, thereby forming the annular groove 33 in such away as to surround the article forming surface 32a and forming the injection groove 33a and the suction groove 33b in such a way as to lead from the annular groove 33 to a side part of the movable mold half 32.

On the other hand, the mold seal groove 37, the injection groove 37a, and the suction groove 37b of the stationary mold half 31 are formed by cutting the contact surface 31b as shown in FIG. 6B. The mold seal groove 37 is formed in an annular shape so as to face the annular groove 33 when clamped. The injection groove 37a and the suction groove 37b are formed so as to lead from the mold seal groove 37 to a side part of the stationary mold half 31. Each of the movable mold half 32 and the stationary mold half 31 according to this embodiment is made of an aluminum alloy, and hence is excellent in machinability, and can easily form the grooves mentioned above. A releasing agent is applied into the mold seal groove 37 formed in the stationary mold half 31 and onto the periphery thereof. In this embodiment, KF412SP (i.e., a paintable type silicon releasing agent manufactured by Shin-Etsu Silicone Co., Ltd.) was used as the releasing agent.

Thereafter, as shown in FIG. 6C, the stationary mold half 31 and the movable mold half 32 are clamped together with a predetermined clamping pressure. When clamped, an injection hole 30c and a suction hole 30d that are substantially circular in cross-section are formed by the injection groove 33a and the injection groove 37a and by the suction groove 33b and the suction groove 37b, respectively. Further, an annular space 30b leading to the injection hole 30c and to the suction hole 30d is formed by the annular groove 33 and the mold seal groove 37.

Prior to clamping, liquid silicone rubber is defoamed while spending sufficient time. In this embodiment, KE-1314 (i.e., shaping type silicone RTV rubber of Shin-Etsu Silicone Co., Ltd.) that is two-component silicone rubber was used as the silicone rubber. CAT-1314S (i.e., hardening agent of Shin-Etsu Silicone Co., Ltd.) was added by 10.0% as a hardening agent. After being hardened, the silicone rubber KE-1314 shows the properties of a hardness (durometer A) of approximately 44 degrees, a tensile strength (MPa) of 5.8, and a working temperature range from −60° C. to 250° C.

Furthermore, prior to clamping, liquid silicone rubber that has been defoamed is applied onto a shorter part of the annular groove 33 between the injection groove 33a and the suction groove 33b and onto a shorter part of the mold seal groove 37 between the injection groove 37a and the suction groove 37b. This application makes it possible to guide liquid silicone rubber injected from the injection hole 30c to the suction hole 30d through a longer part of the annular space 30b between the injection groove 37a and the suction groove 37b in a silicone rubber injection step described later. However, silicone rubber is not necessarily required to be applied onto the shorter part of the mold seal groove 37 between the injection groove 37a and the suction groove 37b.

Under a state of being clamped, as shown in FIG. 6C, an injection hose used to inject liquid silicone rubber under pressure is connected to the injection hole 30c, and a suction hose leading to the vacuum pump is connected to the suction hole 30d. Thereafter, liquid silicone rubber is injected into the annular space 30b through the injection hose while sucking out air occupying the annular space 30b through the suction hose by use of the vacuum pump. Thus, the liquid silicone rubber that has been defoamed is fed under pressure from the injection hole 30c to the suction hole 30d through the annular space 30b.

If the silicone rubber overflows from the suction hole 30d, the silicone rubber stops being fed through the injection hose, and air stops being sucked out through the suction hose. The annular space 30b, the injection hole 30c, and the suction hole 30d can be filled with the liquid silicone rubber in this way. Thereafter, the silicone rubber is hardened, and then the mold is unclamped. When unclamped, the hardened silicone rubber comes off from the stationary mold half 31 to which a releasing agent has been applied, and reaches a state of adhering to the movable mold half 32. Therefore, the mold seal member 36 can be formed while being in contact with the movable mold half 32.

The mold seal member 36 is composed of a fitting part 36a and a base part 36b. The fitting part 36a is formed by the mold seal groove 37, and is substantially the same in shape as the mold seal groove 37. The base part 36b is formed by the annular groove 33, and is substantially the same in shape as the annular groove 33. The base part 36b additionally has a shoulder 36c exposed to the outside between the lower end of the fitting part 36a and the upper end of the annular groove 33.

Although the injection groove and the suction groove are formed in the stationary mold half 31 and the movable mold half 32, respectively, in this embodiment, the injection groove and the suction groove may be formed in one of the stationary mold half 31 and the movable mold half 32. Even if structured in this way, an injection hole and a suction hole both of which lead to the annular space 30b when clamped can be formed.

The mold seal part 32c and the mold seal contact part 31c can be formed by a simple operation as described above. The fitting part 36a of the mold seal member 36 formed in this way results from transferring the surface shape of the mold seal groove 37. When clamped, the mold seal groove 37 comes into face contact with the fitting part 36a of the mold seal member 36 while using the whole of the inner surface thereof. The shoulder 36c results from transferring the surface shape of the contact surface 31b, and comes into face contact with the contact surface 31b when clamped.

Therefore, when clamped, the fitting part 36a and the shoulder 36c come into close contact with the mold seal groove 37 and the contact surface 31b, respectively, so that the parting surface can be sealed. Therefore, in the mold seal part 32c and the mold seal contact part 31c according to this embodiment, a large contact area can be obtained.

When air is discharged from the cavity 30a as described later in a state in which the fitting part 36a and the mold seal groove 37 are in close contact with each other, a pressure difference between the outside of the cavity 30a and the inside thereof causes the silicone-rubber-made mold seal member 36 that has elasticity (whose hardness (durometer A) is approximately 44 degrees) to be sucked into contact with the inside of the cavity 30a. Therefore, the mold seal member 36 and the mold seal groove 37 come into face contact with each other more airtightly, so that sealability can be heightened.

In this embodiment, the mold seal member 36 is made of silicone rubber, and hence is excellent in adhesion to metal. Additionally, silicone rubber is excellent in durability, and hence does not cause a deterioration in sealability in spite of long-term use. A mold structured to secure the sealability between the inside of a cavity and the outside thereof by providing an O-ring has a conventional problem in the fact that the O-ring is broken, or is reduced in elasticity by repeatedly performing a molding operation, so that sealability is lowered, and, as a result, it becomes impossible to maintain a sealed state. Therefore, for example, much time is consumed to regularly inspect the O-ring.

However, in the mold 30 according to this embodiment, face contact is created by fitting the fitting part 36a of the mold seal member 36 into the mold seal groove 37. Further, air is evacuated from the cavity 30a, and, as a result, the atmospheric pressure difference causes the mold seal member 36 to be sucked into airtightly close contact with the inner wall of the mold seal groove 37, thus securing sealability. Accordingly, the mold seal member 36 never receives a great deforming force even in a state in which the mold is clamped to secure sealability. Therefore, face contact enables the mold seal member 36 to reliably secure sealability. Additionally, since disadvantages, such as structural damage or a decrease in elasticity, are not brought about in spite of the fact that a molding operation is repeatedly performed, manufacturing costs can be reduced as a whole.

Additionally, the mold 30 according to this embodiment is structured so that the space between the inside of the cavity 30a and the outside thereof is sealed with the face contact between the mold seal member 36 and the mold seal groove 37, sealability can be easily secured regardless of the size of the mold 30 even if the mold 30 becomes large in size.

(Vacuum Exhaust Structure of the Cavity)

Next, the mold vacuum valve 40 according to this embodiment will be described with reference to FIG. 7A and FIG. 7B. FIG. 7A and FIG. 7B are sectional explanatory drawings of the mold vacuum valve 40 viewed from the nozzle 13.

The mold vacuum valve 40 according to this embodiment is composed of a main body 40a, a valve element 47 that slides in the main body 40a, a coil spring 48 serving as an urging means (i.e., force-applying means) for urging the valve element 47, an actuation hose 43a and an exhaust hose 44a both of which are connected to the main body 40a, and a connection part 42 connected to an end of the actuation hose 43a and to an end of the exhaust hose 44a. The connection part 42 communicates with the actuation hose 43a and with the exhaust hose 44a. A pipe 59 is connected to the exterior of the connection part 42.

The main body 40a has a sprue 41 passing through the main body 40a. The sprue 31f includes the sprue 41, thus forming an injection passage through which molten resin is injected from the nozzle 13 to the gate 31d. A closed-end actuation hole 43 is formed in a direction substantially perpendicular to the sprue 41 from the side face of the main body 40a. The actuation hole 43 communicates with the sprue 41 through an exhaust hole 41a formed in the side face of the sprue 41. The actuation hose 43a is connected to the actuation hole 43.

The main body 40a additionally has a closed-end exhaust hole 44 in parallel with the actuation hole 43. The exhaust hole 44 and the actuation hole 43 communicate with each other through a communication hole 45. The communication hole 45 is formed nearer to the sprue 41 (i.e., nearer to the bottom). The exhaust hose 44a is connected to the exhaust hole 44. The exhaust hole 44 is smaller in diameter than the actuation hole 43.

The valve element 47 is disposed at the actuation hole 43, and is composed of a disk part 47b, a cylindrical cap part 47a passing through the disk part 47b, and a slide part 47c extending in the lengthwise direction of the cap part 47a from the rear side of the cap part 47a. The mold vacuum valve 40 according to this embodiment corresponds to a change-over valve of the present invention, and the actuation hole 43 according to this embodiment corresponds to an actuation space of the present invention.

The cap part 47a is a member used to close the exhaust hole 41a. The actuation hole 43 has a tapered part 43c communicating with the exhaust hole 41a. A tip 47aa of the cap part 47a is also tapered in accordance with the tapered part 43c. The cap part 47a is urged toward the exhaust hole 41a, and, accordingly, the tapered tip 47aa enters the tapered part 43c formed on the side of the exhaust hole 41a, so that the actuation hole 43 can be airtightly closed.

The actuation hole 43 is formed to be cross-sectionally circular on the side of the sprue 41, and has two grooves 43b so as to enlarge the actuation hole 43 along a direction perpendicular to the sprue 41. The disk part 47b is a circular member having an outer diameter substantially equal to an inner diameter of the actuation hole 43, and has radially-extending engagement pieces 47ba that are substantially the same in shape as the two grooves 43b formed in the actuation hole 43 and that are engaged with the grooves 43b, respectively. The cap part 47a according to this embodiment corresponds to a hole closing part of the present invention.

The disk part 47b is disposed so as to be movable back and forth in the lengthwise direction of the actuation hole 43 in a state in which the engagement piece 47ba is engaged with the groove 43b. A supporter 46 that slidably holds the slide part 47c is fixed to the actuation hole 43 so as to close the actuation hole 43. The supporter 46 has a plurality of through-holes 46a that are bored in the sliding direction and by which air is allowed to flow.

A coil spring 48 is disposed between the rear surface of the disk part 47b and the supporter 46. The coil spring 48 is inserted in the cap part 47a from the rear side of the valve element 47. The coil spring 48 urges the valve element 47 toward the sprue 41. The valve element 47 is urged by the coil spring 48, so that the communication hole 45 is closed with the side face of the disk part 47b when the exhaust hole 41a is closed with the tip of the cap part 47a (i.e., in a closing position).

Next, the operation of the mold vacuum valve 40 will be described. As shown in FIG. 7A, when the mold vacuum valve 40 is not communicating with the vacuum exhaust means 90 while allowing the electromagnetic valve 59b to be in a closed state, the valve element 47 is urged by the coil spring 48 toward the sprue 41, and the exhaust hole 41a is closed with the tip of the cap part 47a (i.e., in a closing position).

On the other hand, when an opening signal is sent to the electromagnetic valve 59b from the control means 100, the electromagnetic valve 59b reaches an open state, and, accordingly, the mold vacuum valve 40 communicates with the vacuum exhaust means 90. As a result, as shown in FIG. 7B, air in the actuation hole 43 and the exhaust hole 44 is exhausted therefrom by the vacuum exhaust means 90.

At this time, a great sucking force is exerted on the disk part 47b because the actuation hole 43 is greater in diameter than the exhaust hole 44. As a result, the valve element 47 is slid in a direction away from the sprue 41 against the urging force. While air is being evacuated from the cavity 30a, the valve element 47 is held at a position (exhaust position) apart from the sprue 41.

When the valve element 47 is held at the exhaust position, the exhaust hole 41a is opened, and the communication hole 45 is opened. Accordingly, the sprue 41 and the exhaust hole 44 communicate with each other through the communication hole 45. Since the sprue 41 and the exhaust hole 44 communicate with each other, the cavity 30a is allowed to communicate with the vacuum exhaust means 90 through mold vacuum valve 40, and is evacuated of air into a vacuum state by the vacuum exhaust means 90.

When a predetermined time elapses after the cavity 30a reaches a vacuum state, the control means 100 sends a closing signal to the electromagnetic valve 59b so as to reach a closed state. When the flow of air from the cavity 30a is stopped resulting from the fact that the air pressure in the cavity 30a becomes substantially equal to the air pressure in the pipe 59 or the fact that the electromagnetic valve 59b is brought into the closed state, the valve element 47 returns to the closing position by receiving the urging force of the coil spring 48, and the exhaust hole 41a is closed with the cap part 47a.

The mold vacuum valve 40 according to this embodiment opens or closes the electromagnetic valve 59b in this way, thereby making it possible to evacuate the cavity 30a of air from the gate 31d through the sprue 41. As described above, in this embodiment, the valve element 47 can perform switching between the exhaust position and the closing position. In the exhaust position, air in the cavity 30a can be exhausted from the exhaust hole 41a through the gate 31d. Additionally, in this embodiment, since the exhaust hole 41a is closed in the closing position, the cavity 30a can be kept in a vacuum state. Still additionally, molten resin never flows into the mold vacuum valve 40 from the exhaust hole 41a when the molten resin is injected.

(Vacuum Exhaust and Resin Material Supplying Structure of Hopper)

Next, a material supplying section 20 according to this embodiment will be described with reference to FIG. 8. The material supplying section 20 according to this embodiment is structured so that a material supplying tank 25 that supplies material to the cylinder 11 can be kept in a vacuum state. The material supplying section 20 is composed mainly of a hopper 21, a first supply valve 23 connected to a lower part of the hopper 21, the cylindrical material supplying tank 25 connected to the hopper 21 through the first supply valve 23, a second supply valve 26 connected to a lower part of the material supplying tank 25, and a cylindrical material holding part 27 connected to the material supplying tank 25 through the second supply valve 26.

The hopper 21 is provided with a sensor 21a that detects the presence or absence of a predetermined amount of resin material in the hopper 21. A suction pump 22 is disposed on an upper part of the hopper 21. A hose 22a is connected to the suction pump 22. An end of the hose 22a is inserted in an outside tank 3 in which granular resin material is stored.

The suction pump 22 is actuated by receiving a driving signal from the control means 100. When the suction pump 22 is actuated, the resin material in the outside tank 3 is sucked together with air, and is conveyed into the hopper 21 through the hose 22a.

The first supply valve 23 is composed of a valve body 23a having a valve that airtightly opens or closes an internal passage and a valve switch 23b to which a hose through which compressed air flows from a compressed-air supplying source 4 is connected. Based on a driving signal emitted from the control means 100, the valve switch 23b supplies compressed air to the valve body 23a so as to open or close the valve, and sends an opening/closing position signal to the control means 100 by detecting the open or closed state of the valve.

The material supplying tank 25 is formed in a substantially cylindrical shape. A pipe 28 is connected to the center of the side face of the material supplying tank 25. A vacuum sensor 25a that measures the air pressure in the material supplying tank 25 and a digital vacuum meter 25c are attached to the exterior of the material supplying tank 25. The vacuum meter 25c sends a detection signal obtained by measuring the internal air pressure therein to the control means 100. The control means 100 uses this detection signal for controlling and displaying.

The pipe 28 has a midway point to which a filter 28e is connected. The pipe 28 is divided in two directions on the downstream side of the filter 28e. The vacuum tank 92 is connected to one of the two divided pipes through the electromagnetic valve 28a. The electromagnetic valve 28b and a silencer 28f opening toward the atmosphere are connected to the other one of the two divided pipes. A pipe 59 is joined to the pipe 28 between the electromagnetic valve 28a and the vacuum tank 92.

A hand valve 28c is connected to the pipe between the vacuum tank 92 and the electromagnetic valve 28a. An operator can open or close the passage between the vacuum tank 92 and the electromagnetic valve 28a by operating the hand valve 28c. The hand valve 28c is normally in an open state. The pipe 28 is further divided in two directions on the downstream side of the hand valve 28c. The vacuum tank 92 is connected to one of the two divided pipes, and a hand valve 28d is connected to the other one. The hand valve 28d is normally in a closed state. When the hand valve 28d is brought into an open state, the vacuum tank 92 is opened toward the atmosphere.

The electromagnetic valves 28a and 28b are opened or closed by receiving a driving signal from the control means 100, and send an opening/closing position signal to the control means 100. The hand valves 28c and 28d can be opened or closed by allowing the operator to manually operate these valves. A pipe 18 is connected to the side face of the material supplying tank 25. The pipe 18 extends toward the nozzle 13, and is connected to a heat cover 16 disposed on the cylinder 11 through an electromagnetic valve 19. The electromagnetic valve 19 is opened or closed in response to a driving signal emitted from the control means 100, and sends an opening/closing position signal to the control means 100.

The heat cover 16 is disposed on the outer periphery of the cylinder 11 in such a way as to cover the band heater 15. The heat cover 16 has a suction inlet 16a and an exhaust outlet 16b. The pipe 18 is connected to the exhaust outlet 16b. A fan 17 used to send out air occupying the inside of the heat cover 16 toward the material supplying section 20 is disposed near the exhaust outlet 16b.

The second supply valve 26 connected to the lower part of the material supplying tank 25 is the same in structure as the first supply valve 23, and is composed of a valve body 26a and a valve switch 26b. The material holding part 27 is provided with a sensor 27a. This sensor 27a detects whether a predetermined amount of resin material is held by the material holding part 27, and sends a detection signal to the control means 100.

If an affirmative result of the resin material is detected, the sensor 27a sends a signal to the effect that a predetermined amount of resin material is being retained (i.e., a filled-with-material signal) to the control means 100. If an affirmative result of the resin material is not detected, the sensor 27a sends a signal to the effect that a predetermined amount of resin material is not being retained (i.e., a not-filled detection signal) to the control means 100.

Two pipes 29 are respectively connected to two places of the lower part of the material holding part 27. One of the pipes is opened toward the atmosphere through a hand valve 29b, where as the other one is connected to a suction pump 29a through a hand valve 29c. The hand valves 29b and 29c are normally in a closed state.

The hand valve 29d is connected to the pipe at a location downstream of the suction pump 29a. At a location most downstream of the hand valve 29d, the pipe to which the hand valve 29d is connected is joined with the pipe 28 between the electromagnetic valve 28b and the filter 28e. For example, when the resin material is replaced with another, the suction pump 29a is used to discharge the resin material to the outside from the material holding part 27.

In the injection molding apparatus S according to this embodiment, the material holding part 27 is always kept in a vacuum state during molding. Accordingly, the inside of the cylinder 11 is also kept in a vacuum state, so that resin material can be made molten in a vacuum state. In more detail, when a resin material is supplied to the material holding part 27, the control means 100 first sends an opening signal to the electromagnetic valve 28b, and brings the electromagnetic valve 28b into an open state. The first supply valve 23 is then opened or closed while opening the material supplying tank 25 toward the atmosphere, so that the resin material sucked up in the hopper 21 is dropped into the material supplying tank 25, and is retained therein. At this time, the electromagnetic valve 19 is brought into an open state by receiving an opening signal, and hot air is sent into the material supplying tank 25, thus drying the resin material. Thereafter, the control means 100 sends a closing signal to the electromagnetic valves 19 and 28b, and brings these valves into a closed state. On the other hand, the control means 100 sends an opening signal to the electromagnetic valve 28a so that the material supplying tank 25 is evacuated of air into a vacuum state by the vacuum tank 92.

When it is detected by a detection signal emitted from the vacuum meter 25c that the material supplying tank 25 has been evacuated of air and has reached a predetermined degree of vacuum, the control means 100 sends an opening signal to the second supply valve 26 and brings the second supply valve 26 into an open state. Accordingly, the material supplying tank 25 and the material holding part 27 are allowed to communicate with each other, and a predetermined amount of resin material is dropped from the material supplying tank 25 into the material holding part 27. The material holding part 27 can be always kept in a vacuum state in this way.

(Process Steps of Injection Molding)

Next, the operation of the injection molding apparatus S according to this embodiment will be described with reference to FIG. 9. Herein, a description of a resinous-material supplying operation in the material supplying section 20 is omitted. In the injection molding apparatus S according to this embodiment, an operation to inject a molten resin into the cavity 30*a* described later can be performed independently of an operation to supply a resin material into the material holding part 27.

Therefore, molded articles can be continuously formed without interrupting a molten-resin injecting operation even when a scarcity of resin material in the material holding part 27 arises at any stage of the molten-resin injecting operation.

The operator presets the injection means 10 and the clamping means 80 from the operation section 103. The control means 100 allows the clamping means 80 to clamp the movable mold half 32 and the stationary mold half 31 together under a predetermined clamping pressure by sending an actuation signal to the clamping means 80.

When clamped, a detection signal is sent from the position detecting switch 88 to the control means 100 (A of FIG. 9). The control means 100 receives this detection signal, and then sends an opening signal to the electromagnetic valve 59*b*, thereby bringing the electromagnetic valve 59*b* to an open state (B of FIG. 9). As a result, the mold vacuum valves 40 and 50 come to an open state, and the cavity 30*a* is evacuated of air up to a predetermined degree of vacuum. Based on a detection signal emitted from the vacuum meter 59*c*, the control means 100 detects that the cavity 30*a* has been evacuated of air up to the predetermined degree of vacuum, and, after a predetermined time elapses, sends a closing signal to the electromagnetic valve 59*b*, thereby bringing the electromagnetic valve 59*b* to an open state (C of FIG. 9).

An actuation signal is sent from the control means 100 to the driving unit 14, and the screw 12 is rotated. The resin material supplied from the material supplying section 20 into the cylinder 11 is conveyed to the front of the cylinder 11 by the rotation of the screw 12, and, as a result, molten resin is retained at the front of the cylinder 11. Since the resin material is plasticized and kneaded under a vacuum as described above, gases and water generated when the resin material comes to a molten state are removed.

Under this state, the control means 100 sends an actuation signal to the driving unit 14 of the injection means 10, the screw 12 is then moved forwards, and a predetermined amount of molten resin is injected from the nozzle 13 into the cavity 30*a* (D of FIG. 9).

The molten resin is injected thereinto, and, after a predetermined cooling time elapses, the control means 100 sends an actuation signal to the injection means 10, thereby allowing the injection means 10 to move the screw 12 backwards (E of FIG. 9). In response to the backward movement of the screw 12, the control means 100 sends an actuation signal to the clamping means 80, thereby allowing the movable mold half 32 to recede so as to unclamp the mold (F of FIG. 9). At this time, a detection signal to the effect that the mold has been unclamped is sent from the position detecting switch 88 to the control means 100. The ejector pin 36A is then actuated, and a molded article is taken out from the mold (G of FIG. 9).

The injection molding apparatus S again repeats the process including the clamping step, the air evacuation step, the injection step, the cooling step, and the unclamping step, thus continuously forming molded articles. In a case in which the cylinder 11 shifts in forward and backward directions and has a nozzle touch with the mold 30 during each molding, the mold is clamped, and then the cavity 30*a* is evacuated of air by the nozzle touch. Accordingly, when the screw 12 is moved backwards, the cylinder 11 can be allowed to recede therefrom.

As described above, in the injection molding apparatus according to this embodiment, the cavity 30*a* is brought to a vacuum state when injected. Since the mold 30 according to this embodiment has a sealing structure at this time, the vacuum state can be excellently maintained. Since the cavity 30*a* comes to the vacuum state, air resistance hardly arises during molding, and hence molten resin can be swiftly and uniformly spread throughout the cavity 30*a* with a low injection pressure.

Therefore, a molded article does not undergo partial discoloration, cracks, molding sinks, burns, weld lines, shorts, etc. For example, even if the molded article is a long deep item, such as a reinforcing rib, or a fine-mesh item (a lattice item), a filling shortage never occurs. Additionally, in the injection molding apparatus according to this embodiment, molten resin is swiftly and uniformly supplied as described above, and hence a molded article in which internal stress is extremely small can be formed.

Additionally, in the injection molding apparatus according to this embodiment, the cavity 30*a* is in a vacuum state when injected, and hence molten resin can be injected into the mold 30 with a lower injection pressure than in a conventional injection molding apparatus. Since this makes it possible to reduce the clamping pressure, the clamping means 80 can be changed to the one that has low power. Thus, in the injection molding apparatus according to this embodiment, the injection pressure and the clamping pressure can be made low, and hence energy saving and cost reductions can be achieved more easily than in the conventional injection molding apparatus.

Still additionally, in the injection molding apparatus according to this embodiment, molten resin can be reliably spread throughout the mold 30, and hence the cavity of the mold 30 can be transferred accurately and reliably, and a difference never arises between a molded article imaged at a mold design stage and a molded article that has been actually formed with the mold 30. Since such a difference does not arise, a mold design can be easily carried out, and a period of time spent in mold production can be shortened.

Still additionally, in the injection molding apparatus according to this embodiment, the clamping pressure can be made low as described above, and hence, unlike the conventional apparatus, there is no need to use an oil-hydraulic device that can generate a high clamping pressure or a large-sized mold having durability. Therefore, the injection molding apparatus can be reduced in size, and can be produced at low cost. Still additionally, in accordance with the size reduction and the weight reduction of the injection molding apparatus, cranes in plant facilities in which the injection molding apparatus is installed can be advantageously established at a small number of tons.

Still additionally, the injection molding apparatus according to this embodiment can perform a fine adjustment by 0.1 millimeters since molten resin can be reliably spread throughout the cavity in the mold 30, although the conventional injection molding apparatus adjusts the dimensions of a molded article by 1 millimeter. Therefore, a molding operation can be excellently performed even when a thinning process is carried out, or the mold 30 has a complex shape. Therefore, a desired molded article can be produced without being limited to its shape or thickness.

For example, although the limit of the thickness of a molded article produced by the conventional apparatus is 1 mm, the injection molding apparatus according to this embodiment can produce a molded article having a thickness of 0.1 mm, which is approximately $\frac{1}{10}$ times as large as the conventional one. Accordingly, the volume of the molded article can be reduced to be approximately $\frac{1}{10}$ times as large as the conventional one. According to the injection molding apparatus according to this embodiment, since a molded article can be made thinner than a conventional one, the amount of resin injected thereinto can be reduced, and an injecting time and a cooling time can be shortened. Therefore, a molding cycle can be shortened. Therefore, energy saving can be achieved, and productivity can be heightened. For example, in the injection molding apparatus according to this embodiment, the molding cycle time can be shortened to from ½ to ⅓.

Concerning a thick molded article, a molded article as thick as the one produced by the conventional injection molding apparatus can be produced by the injection molding apparatus of the present invention.

(Sealing Structure of Parting Surface: Another Embodiment)

Next, referring to FIG. 10 to FIG. 12, a description will be given of another embodiment of the sealing structure for sealing the parting surface. In this embodiment, the same reference character is given to the same constituent as above, and an overlapping description of the same is omitted.

FIG. 10A shows a contact surface 32b of a movable mold half 32. A mold seal part 132c in this modified embodiment is formed along the outer periphery of the contact surface 32b in such a way as to surround an article forming surface 32a. FIG. 10B shows a contact surface 31b of a stationary mold half 31. As in the mold seal part 32c, a mold seal contact part 131c is formed along the outer periphery of the contact surface 31b.

As shown in FIG. 11, the mold seal part 132c is composed of an injection groove 133 serving as an annular groove or a first groove part formed in such a way as to surround the cavity 30a, a partition wall 134 serving both as an inner side face and as an outer side face of the injection groove 133, clearance grooves 135 serving as a second groove part formed adjacent to the injection groove 133 with the partition wall 134 there between, and a silicone-rubber-made mold seal member 136 that has elasticity and that is disposed in such a way as to protrude from the injection groove 133 toward the stationary mold half 31. A fall-off stopping groove 133a that holds the mold seal member 136 while preventing the mold seal member 136 from falling off is formed in the bottom of the injection groove 133.

A mold seal groove 137 is formed in the mold seal contact part 131c in this modified embodiment at a position facing the mold seal member 136. The injection groove 133, the clearance groove 135, and the mold seal groove 137 are formed by cutting and machining the mold surface.

In the mold seal part 132c in this modified embodiment, the clearance groove 135 has a depth of approximately 22 mm and a width of approximately 4 mm, the partition wall 134 has a height of approximately 18 mm and a width of approximately 2 mm, and the injection groove 133 has a width of approximately 15 mm. Therefore, when clamped, a gap 134a of approximately 4 mm is created between the partition wall 134 and the contact surface 31b.

The mold seal member 136 protrudes by approximately 15 mm from the contact surface 32b toward the stationary mold half 31. The tip of the mold seal member 136 is formed in a semicircular shape in cross-section. The mold seal groove 137 of the mold seal contact part 131c has a depth of approximately 15 mm and a width of approximately 15 mm. The bottom face thereof is formed in a semicircular shape in cross-section so as to have substantially the same cross-sectional shape as that of the tip of the mold seal member 136. The width of the mold seal groove 137 is set to be the same as the width of the injection groove 133.

In the mold seal contact part 131c and the mold seal part 132c in this modified embodiment, the injection groove 133 and the mold seal groove 137 are set at approximately 15 mm in width. However, without being limited to this, it is recommended to set the width to fall within a range of from approximately 10 mm to 50 mm in accordance with the dimensions of the mold. If the width is set to fall within this range, an area in which the mold seal member 136 and the mold seal groove 137 are brought into close contact with each other can be secured as described later, and sealing can be reliably achieved between the stationary mold half 31 and the movable mold half 32.

Next, referring to FIG. 12A to FIG. 12D, a description will be given of a method of forming the mold seal member 136. As shown in FIG. 12A, the injection groove 133, the partition wall 134, the clearance groove 135, and the mold seal groove 137 each of which has the dimensions mentioned above are first formed in the stationary and movable mold halves 31 and 32 while being subjected to cutting operations. At this time, the injection groove 133 and the mold seal groove 137 are formed at positions facing each other, respectively.

After the contact surfaces 31b and 32b are machined in this way, liquid silicone rubber 2 is injected into the injection groove 133 as shown in FIG. 12B. At this time, the liquid silicone rubber 2 is poured so as to be raised from the top end of the partition wall 134 toward the stationary mold half 31. In this modified embodiment, specifically, the silicone rubber 2 is raised by approximately 15 mm to 20 mm from the contact surface 32b. In this modified embodiment, KE45 (manufactured by Shin-Etsu Silicone Co., Ltd.), which is one-component RTV rubber, was used as the silicone rubber.

Thereafter, to enable the mold seal groove 137 to easily separate from the hardened silicone rubber 2, a releasing agent is applied to the mold seal groove 137. As shown in FIG. 12C, after applying the releasing agent and before allowing the silicone rubber 2 to harden, the movable mold half 32 and the stationary mold half 31 are clamped together, and, in this state, the silicone rubber 2 is hardened. At this time, the silicone rubber 2 comes into contact with the bottom face and the side face of the mold seal groove 137, and, as a result, a part of the silicone rubber 2 that has not entered the mold seal groove 137 is pushed out from a gap between the contact surface 31b and the top end of the partition wall 134 toward the clearance groove 135.

If the clearance groove 135 is not formed in the side face of the injection groove 133, the silicone rubber 2 will enter the space between the contact surfaces 31b and 32b, and hence there is a fear that the sealability between the stationary mold half 31 and the movable mold half 32 cannot be secured. However, in the mold 30 in this modified embodiment, extra silicone rubber 2 is pushed out to the clearance grooves 135 formed in parallel with the sides of the injection groove 133. Therefore, the silicone rubber 2 can be prevented from entering the contact surfaces 31b and 32b, so that the sealability between the stationary mold half 31 and the movable mold half 32 can be secured.

After the silicone rubber 2 is hardened, the mold is unclamped. Thereafter, the silicone rubber 2 is pushed out to the clearance groove 135 while the mold is unclamped as shown in FIG. 12D, and extra silicone rubber 2a that has been hardened is removed, thus forming the mold seal member 136. The silicone rubber 2 poured thereinto is bonded to the side wall and the bottom face of the injection groove 133 at the base of the mold seal member 136. Although the extra silicone rubber 2a is removed in this modified embodiment, that is not necessarily required to be removed.

The mold seal member 136 can be formed by a simple operation in this way. The top of the contact part of the mold seal member 136 formed in this way results from transferring the surface shape of the mold seal groove 137. When clamped, the mold seal groove 137 comes into contact with the mold seal member 136 while using the whole of the inner surface thereof. Thus, the top part of the mold seal member 136 and the mold seal groove 137 are substantially the same in shape, are easily brought into close contact with each other, and are great in contact area. Additionally, silicone rubber has excellent adhesion to metal, and is superior in durability, and hence does not cause a deterioration in sealability in spite of long-term use.

Therefore, the stationary mold half 31 and the movable mold half 32 can secure the sealability between the inside of the cavity 30*a* and the outside thereof by the face contact between the mold seal member 136 and the mold seal groove 137. Additionally, since the mold seal member 136 is fitted into the mold seal groove 137 when clamped, the sealability can be made higher.

In the above embodiment, the clearance grooves 135 are provided on both sides of the injection groove 133, respectively. However, without being limited to this, the clearance groove 135 may be provided only on one side of the injection groove 133 as shown in FIG. 13A to FIG. 13C. FIG. 13A shows an example in which the mold seal groove 137 is formed to be equal in width to the injection groove 133 and is formed in a substantially semicircular shape in cross-section and in which the clearance groove 135 is formed only on one side of the injection groove 133. FIG. 13B shows an example in which the mold seal groove 137 is formed to be equal in width to the injection groove 133 and is formed in a rectangular shape in cross-section and in which the clearance groove 135 is formed only on one side of the injection groove 133.

FIG. 13C shows an example in which the clearance groove 135 is formed only on one side of the injection groove 133, in which the width of the mold seal groove 137 is set to be equal to the distance from the outside surface of the injection groove 133 to the outside surface of the clearance groove 135, and in which the mold seal groove 137 is formed in a rectangular shape in cross-section. Even if the clearance groove 135 is formed only on one side of the injection groove 133 in this way, silicone rubber can be pushed out to the clearance groove 135 when clamped during the formation of the mold seal member 136, and an excellent contact surface can be created between the mold seal member 136 and the mold seal groove 137.

(Structure of Mold: Another Embodiment)

Referring to FIG. 14 to FIG. 17, still another embodiment of the mold will be described. In this embodiment, the same reference characters are given to the same member, the same arrangement, etc., as in the embodiments mentioned above, and an overlapping description of the same is omitted. The mold 230 according to this embodiment is composed of a stationary mold half 231 and a movable mold half 232. The movable mold half 232 has a convex mold seal member 236 made of silicone rubber, where as the stationary mold half 231 has a mold seal groove 237 into which the mold seal member 236 is fitted when clamped. The mold seal member 236 and the mold seal groove 237 are engaged with each other when clamped, so that the mold 230 according to this embodiment can seal a cavity.

The movable mold half 232 additionally has an injection groove 233*a* and a suction groove 233*b*, where as the stationary mold half 231 additionally has an injection groove 237*a* and a suction groove 237*b*. When clamped, an injection hole and a suction hole (not shown) having a substantially circular shape in cross-section are formed by the injection groove 233*a* and the injection groove 237*a* and by the suction groove 233*b* and the suction groove 237*b*, respectively. An annular space (not shown) leading to the injection hole and to the suction hole is formed by an annular groove 33 and a mold seal groove 37.

Thereafter, silicone rubber is injected under pressure from the injection hole, and the annular space is filled with the silicone rubber while evacuating air through the suction hole. The silicone rubber is then hardened, thus forming the mold seal member 236.

Besides the constituents mentioned above, the mold 230 according to this embodiment additionally has a slide block 238 used to form an undercut part. In the mold 230 according to this embodiment, the mold seal member 236 is disposed outside the slide block 238. In this embodiment, projection parts 234*a* and 234*b* are formed outside the slide block 238, and the mold seal member 236 and the mold seal groove 237 are located at the projection parts 234*a* and 234*b*.

The projection part 234*a* is provided at the stationary mold half 231, and the mold seal groove 237 is formed in this projection part 234*a*. The projection part 234*b* is provided at the movable mold half 232, and the mold seal member 236 is formed on this projection part 234*b*.

The slide block 238 is provided at the movable mold half 232. The slide block 238 is movable in the direction of an arrow of FIG. 14. The slide block 238 has holes 238*a*. The hole 238*a* is slanted with respect to the direction in which the mold 230 is clamped.

The stationary mold half 231 has slant pins 239 that can be respectively engaged with the holes of the slide block. When the movable mold half 232 is moved in the clamping direction, the slant pin 239 of the stationary mold half 231 is engaged with the hole 238*a* of the slide block 238 of the movable mold half 232. The slide block 238 is moved in the direction of the arrow of FIG. 14 in response to the insertion of the slant pin 239 into the hole 238*a*.

When the slide block 238 enters the cavity, an undercut part is formed in the cavity. The undercut part is the one that includes a claw 304 in a molded article 301 shown in FIG. 16. As shown in FIG. 17, the claw 304 has a cut part 305, which corresponds to the undercut part. The cut part 305 is formed by allowing the slide block 238 to enter the cavity.

On the other hand, when the movable mold half 232 is moved in the unclamping direction, the engagement between the slant pin 239 and the slide block 238 is gradually released. The slide block 238 is moved in a direction receding from the cavity toward its original position while the slant pin 239 is being slipped out of the hole 238*a*. The slide block 238 is disengaged from the cut part 305 corresponding to the undercut part of the molded article 301 in this way, so that the molded article 301 can be taken out from the mold 230.

As shown in FIG. 14, the mold 230 according to this embodiment additionally has different insert members on the molding surface thereof. An insert member 231*a* is provided on the stationary mold half 231, where as insert members 232*a* to 232*c* are provided on the movable mold half 232. These insert members are provided to machine the details of a molded article with high accuracy or to heighten abrasion resistance.

FIG. 16 shows a molded article 301 produced by the mold 230 according to this embodiment. A surface shown by reference character 303*a* of FIG. 16 is formed by the insert member 231*a* that constitutes the molding surface of the stationary mold half 231. This surface corresponds to the surface of the molded article 301. A surface shown by reference character 303*b* of FIG. 16 is formed by the insert members 232*a* to 232*c* that constitute the molding surface of the movable mold half 232. This surface corresponds to the back surface of the molded article 301. The insert members 232b and 232c differ from the insert member 232a, and are attached to the insert member 232a. The insert members 232b and 232c are provided to form hole parts 306 and 307 of the molded article 301.

In more detail, the insert members 232b and 232c protrude more forward than the insert member 232a, and come into close contact with the mold surface facing the insert members 232b and 232c when clamped, and hence the hole parts 306 and 307 of the molded article 301 are formed without allowing molten resin to enter this contact part.

The insert members 231a and 232a are fixed to the mold with tightening bolts B. FIG. 15 shows a state in which the insert member 231a is attached in the stationary mold half 231. As shown in FIG. 15, the insert member 231a to which the tightening bolt B is screwed is pulled and fixed to the stationary mold half 231 by tightening the tightening bolt B. Although FIG. 15 shows an attached state of the insert member 231a in the stationary mold half 231, the insert member 232a is likewise fixed with a tightening bolt B in the movable mold half 232.

As shown in FIG. 15, the mold 230 according to this embodiment has a bolt-setting part 235 of the tightening bolt B. A sealing member 235a is provided at the bolt-setting part 235 in the same way as above. The sealing member 235a prevents air from flowing thereinto from the place where the tightening bolt B is attached, thus securing the airtightness of the cavity.

As described above, in the mold 230 according to this embodiment, the cavity is kept in a vacuum state during molding. Therefore, molten resin can be swiftly and uniformly spread with a low injection pressure throughout a complexly shaped cavity having an undercut part. Therefore, a high-quality molded article 301 can be produced.

(Vacuum Exhaust Structure of Cavity: Another Embodiment)

Next, a mold vacuum valve 140 according to another embodiment will be described with reference to FIG. 18 to FIG. 20B. FIG. 18 and FIG. 19 are sectional side views for explaining the mold 30 and the mold vacuum valve 140. FIG. 20A and FIG. 20B are sectional side views taken from the side of a nozzle 13 for explaining the mold vacuum valve 140.

The mold vacuum valve 140 according to this embodiment is attached to a concave part 31e of the stationary mold half 31, and is composed mainly of a cylinder tube 141, a valve slide part 142 airtightly connected to an end in the axial direction of the cylinder tube 141, a piston rod 143 moved back and forth in the axial direction of the cylinder tube 141, air hoses 145a and 145b through which compressed air used to move the piston rod 143 back and forth is supplied, an electromagnetic switching valve 140A to which ends of the air hoses 145a and 145b are connected, an air hose 145c through which the electromagnetic switching valve 140A and the compressed-air supplying source 4 are connected together, and an air hose 147 through which an end of the piston rod 143 and the vacuum exhaust means 90 are connected together. The cylinder tube 141 and the valve slide part 142 are equivalent to the main body of the present invention.

The mold vacuum valve 140 according to this embodiment is structured so that the elements disposed on the side of the nozzle 13 can communicate with the cavity 30a at a position to which the piston rod 143 is expanded (i.e., in a state of having been moved rightwardly in FIGS. 18 to 20B), and the cavity 30a can communicate with the elements disposed on the side of the vacuum exhaust means 90 at a position to which the piston rod 143 is contracted (i.e., in a state of having been moved leftwardly in FIGS. 18 to 20B).

The piston rod 143 according to this embodiment has an exhaust passage 143a bored from one end in the axial direction thereof (i.e., a right end thereof in the figures) to a predetermined depth in the axial direction thereof. The piston rod 143 additionally has a through-hole 143b in a direction substantially perpendicular to the axial direction. The through-hole 143b intersects with the exhaust passage 143a near the bottom of the exhaust passage 143a.

The piston rod 143 additionally has an injection hole 143c passing through the piston rod 143 substantially in parallel with the through-hole 143b. This injection hole 143c is formed near the other end of the piston rod 143 (i.e., left end thereof in the figures) so as not to lead to the exhaust passage 143a.

The cylinder tube 141 holds the piston rod 143 so that the piston rod 143 can be moved back and forth rightwardly and leftwardly. The electromagnetic switching valve 140A performs switching between internal flow paths in accordance with a control signal emitted from the control means 100, and supplies compressed air to either of the air hoses 145a and 145b. The air hoses 145b and 145a are connected near the right and left ends of the cylinder tube 141. When the electromagnetic switching valve 140A is switched to the air hose 145a, the piston rod 143 is moved leftwardly. When the electromagnetic switching valve 140A is switched to the air hose 145b, the piston rod 143 is moved rightwardly.

The valve slide part 142 includes an internal space through which the piston rod 143 slides airtightly. The valve slide part 142 additionally has a resin injection hole 142a bored in a direction substantially perpendicular to the axial direction of the piston rod 143. The resin injection hole 142a constitutes a part of the sprue 31f in a state in which the mold vacuum valve 140 has been switched so that the gate 31d of the stationary mold half 31 communicates with the nozzle 13.

A sprue bush 31g in which the sprue 31f is bored is provided on the side of the nozzle 13 of the valve slide part 142. As shown in FIG. 20A and FIG. 20B, in the mold vacuum valve 140 according to this embodiment, the sprue bush 31g is attached to the valve slide part 142, or is formed integrally with the valve slide part 142.

When the mold vacuum valve 140 is attached to the concave part 31e of the stationary mold half 31 in this embodiment, the sprue bush 31g having a predetermined thickness internally touches a locating ring 31h provided on the stationary-side mounting plate 33A, thereby positioning the sprue 31f with respect to the nozzle 13. The sprue bush 31g having a predetermined thickness is disposed on the side of the nozzle 13 of the valve slide part 142 in this way, and, as a result, the piston rod 143 is smoothly and airtightly slid inside the valve slide part 142 without causing a distortion in the valve slide part 142 even if a resin injection pressure is applied.

To airtightly slide the piston rod 143, the cylinder tube 141 and the valve slide part 142 according to this embodiment have an annular sealing member 144 provided on a sliding surface that internally touches the piston rod 143.

For example, the sealing member 144 can be made of silicone rubber having elasticity. Since silicone rubber is allowed to be in close contact with the surface of the piston rod 143 because of its elasticity in spite of the fact that the piston rod 143 is slid, sealability in the cylinder tube 141 and in the valve slide part 142 can be secured. Therefore, compressed air never leaks out of the cylinder tube 141, and the piston rod 143 can be reliably moved back and forth. The mold vacuum valve 140 according to this embodiment corresponds to the switching valve of the present invention. The piston rod 143 according to this embodiment corresponds to the valve element of the present invention. The cylinder tube 141 according to this embodiment corresponds to the actuation space of the present invention. Additionally, the injection hole 143c according to this embodiment corresponds to the first hole of the present invention, and the through-hole 143b and the exhaust passage 143a according to this embodiment correspond to the second hole of the present invention.

Next, the operation of the mold vacuum valve 140 according to this embodiment will be described. The mold vacuum valve 140 according to this embodiment is normally held at a position to which the piston rod 143 is expanded (i.e., in a state of having been moved rightwardly) as shown in FIG. 20B. When a predetermined time elapses (corresponding to B of FIG. 9) after the mold 30 is clamped, a control signal according to which switching between internal flow paths is performed is sent from the control means 100 to the electromagnetic switching valve 140A. Accordingly, as shown in FIG. 20A, the air hose 145a and the air hose 145c are connected together through the electromagnetic switching valve 140A, and the piston rod 143 is held in a state of having been moved leftwardly.

At this time, the through-hole 143b of the piston rod 143 is held at a position that allows the through-hole 143b to communicate with the resin injection hole 142a of the valve slide part 142. Therefore, the sprue bush 31g and the sprue 31f of the stationary mold half 31 reach a state of communicating with the exhaust passage 143a of the piston rod 143 through the resin injection hole 142a and the through-hole 143b. Therefore, air in the sprue 31f and in the cavity 30a is sucked to the vacuum exhaust means 90 through the exhaust passage 143a and the air hose 147. As a result, the sprue 31f and the cavity 30a reach a vacuum state.

Thereafter, when a predetermined time elapses (which corresponds to the part between B and C of FIG. 9) after the cavity 30a reaches a vacuum state, a control signal for switching between internal flow paths is sent from the control means 100 to the electromagnetic switching valve 140A. According to this signal, the electromagnetic switching valve 140A performs switching to allow the air hose 145b and the air hose 145c to communicate with each other as shown in FIG. 20B. As a result, the piston rod 143 is held in an expanded state, i.e., in a state of having been moved rightwardly. The cavity 30a is kept in a vacuum state even in a state in which the piston rod 143 has been moved rightwardly.

At this time, the injection hole 143c of the piston rod 143 is held at a position allowing the injection hole 143c to communicate with the resin injection hole 142a of the valve slide part 142. Therefore, at this time, the sprue bush 31g and the sprue 31f of the stationary mold half 31 communicate with the injection hole 143c and the resin injection hole 142a. The injection hole 143c and the resin injection hole 142a have their parts widened on the side of the cavity 30a. Therefore, when the sprue bush 31g and the sprue 31f of the stationary mold half 31 communicate with the injection hole 143c and the resin injection hole 142a, a resin injection passage having its part widened on the side of the cavity 30a as a whole is formed. Molten resin can be injected from the nozzle 13 into the cavity 30a being in a vacuum state through the resin injection passage formed in this way (which corresponds to D of FIG. 9).

After molten resin is injected thereinto, a screw backward movement is performed (which corresponds to E of FIG. 9), the mold is then unclamped (which corresponds to F of FIG. 9), and a molded article is taken out from the mold (which corresponds to G of FIG. 9). During this time, the piston rod 143 is held in an expanded state (i.e., a state of having been moved rightwardly). Although the vacuum exhaust means 90 is connected directly to the mold vacuum valve 140 in this embodiment, these elements 90 and 140 may be connected together with the electromagnetic valve 59b there between.

The invention claimed is:

1. A mold for injection molding, the mold having a cavity formed by a stationary mold half and a movable mold half, wherein
   the stationary mold half has an exhaust section communicating with a vacuum exhaust means for evacuating air from the cavity,
   a switching valve provided in the exhaust section performs switching between an open position that allows the vacuum exhaust means and the cavity to communicate with each other through a gate part used to inject molten resin into the cavity and a closed position that does not allow the vacuum exhaust means and the cavity to communicate with each other therethrough, wherein the switching valve comprises:
   a main body having an actuation space formed to intersect with a sprue provided in the stationary mold half; and
   a valve element capable of performing switching between the open position and the closed position while airtightly moving back and forth inside the actuation space, wherein
   the valve element has a first hole that constitutes a part of the sprue in the closed position and a second hole one end of which leads to the gate part through the sprue and an opposite end of which leads to the vacuum exhaust means in the open position.

2. The mold of claim 1, further comprising a hole closing part that closes an exhaust hole is provided at a top end of the valve element, wherein
   the switching valve allows the sprue and the vacuum exhaust means to communicate with each other through the actuation space by closing the exhaust hole with the hole closing part in the closed position and by separating the hole closing part from the exhaust hole in the open position.

* * * * *